(12) United States Patent
Tsapatsis et al.

(10) Patent No.: US 11,066,309 B2
(45) Date of Patent: Jul. 20, 2021

(54) DIRECT SYNTHESIS OF HIGH-ASPECT RATIO ZEOLITE NANOSHEETS

(71) Applicant: Regents of the University of Minnesota, Minneapolis, MN (US)

(72) Inventors: Michael Tsapatsis, Edina, MN (US); Mi Young Jeon, Minneapolis, MN (US); Pyung-Soo Lee, Seoul (KR); Donghun Kim, Minneapolis, MN (US); Prashant Kumar, Minneapolis, MN (US); K. Andre Mkhoyan, Minneapolis, MN (US); Joern Ilja Siepmann, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 295 days.

(21) Appl. No.: 15/791,876

(22) Filed: Oct. 24, 2017

(65) Prior Publication Data
US 2018/0111837 A1    Apr. 26, 2018

Related U.S. Application Data

(60) Provisional application No. 62/411,987, filed on Oct. 24, 2016.

(51) Int. Cl.
| | |
|---|---|
| C01B 39/38 | (2006.01) |
| B01J 20/18 | (2006.01) |
| C01B 39/48 | (2006.01) |
| C01B 39/04 | (2006.01) |
| C01B 39/02 | (2006.01) |
| B01D 71/02 | (2006.01) |
| B01D 69/02 | (2006.01) |
| B01D 69/06 | (2006.01) |

(Continued)

(52) U.S. Cl.
CPC ............ *C01B 39/38* (2013.01); *B01D 53/228* (2013.01); *B01D 67/0051* (2013.01); *B01D 67/0086* (2013.01); *B01D 69/02* (2013.01); *B01D 69/06* (2013.01); *B01D 71/028* (2013.01); *B01J 20/18* (2013.01); *B01J 20/28033* (2013.01); *B01J 29/40* (2013.01); *C01B 39/026* (2013.01); *C01B 39/04* (2013.01); *C01B 39/40* (2013.01); *C01B 39/48* (2013.01); *B01D 61/362* (2013.01); *B01D 2256/24* (2013.01); *B01D 2257/7022* (2013.01); *B01D 2257/7027* (2013.01); *B01D 2323/36* (2013.01); *B01D 2325/02* (2013.01); *C01P 2002/90* (2013.01); *C01P 2004/24* (2013.01); *C01P 2004/90* (2013.01); *C01P 2006/16* (2013.01)

(58) Field of Classification Search
CPC ..... C01B 39/38; C01B 39/40; C01P 2004/24; C01P 2004/90; B01J 20/18; B01J 20/28033; B01J 29/40
See application file for complete search history.

(56) References Cited

PUBLICATIONS

Razavian et al,"Seed-asssisted OSDA free synthesis of ZSM-5 . . ."Materials Research Bulletin, 65 (2015) 253-259 (Year: 2015).*

(Continued)

*Primary Examiner* — David M Brunsman
(74) *Attorney, Agent, or Firm* — Fish & Richardson P.C.

(57) ABSTRACT

An example material includes a planar layer of MFI zeolite. The planar layer has a thickness in a range between 4 nm and 10 nm for at least 70% of a basal area of the planar layer. In one embodiment, the planar layer includes an embedded particle of an MFI zeolite.

14 Claims, 29 Drawing Sheets

(51) Int. Cl.
    *B01D 67/00* (2006.01)
    *B01D 53/22* (2006.01)
    *C01B 39/40* (2006.01)
    *B01J 29/40* (2006.01)
    *B01J 20/28* (2006.01)
    *B01D 61/36* (2006.01)

(56) References Cited

PUBLICATIONS

Wannapakdee et al,"One-pot synthesis of novel hierarchical bifunctional Ga/HZSM-5 nanosheets for propane aromatization", RSC Advances Issue 4, 2016 (Year: 2016).*
Agger et al., "Silicalite crystal growth investigated by atomic force microscopy," J. Am. Chem. Soc., 125(3):830-839, Jan. 2003.
Agrawal et al., "Oriented MFI Membranes by Gel-Less Secondary Growth of Sub-100 nm MFI-Nanosheet Seed Layers," Adv. Mater., 27(21):3243-3249, Jun. 2015.
Agrawal et al., "Solution-processable exfoliated zeolite nanosheets purified by density gradient centrifugation," AIChE J., 59(9):3458-3467, Sep. 2013.
Bonilla et al., "Zeolite (MFI) crystal morphology control using organic structure-directing agents," Chem. Mater., 16(26):5697-5705, Dec. 2004.
Caro and Noack,"Zeolite membranes—recent developments and progress," Microporous Mesoporous Mater., 115(3):215-233, Nov. 2008.
Chaikittisilp et al., "Formation of hierarchically organized zeolites by sequential intergrowth," Angew. Chem. Int. Ed., 125(12):3439-43, Mar. 2013.
Cheng et al., "Silicalite-1 growth from clear solution: Effect of the structure-directing agent on growth kinetics," J. Phys. Chem. B., 109(29):13912-13920, Jul. 2005.
Choi et al., "MFI zeolite membranes from a-and randomly oriented monolayers," Adsorption, 12(5-6):339-360, Sep. 2006.
Choi et al., "Stable single-unit-cell nanosheets of zeolite MFI as active and long-lived catalysts," Nature, 461(7261):246-249, Sep. 2009.
Corma, "Inorganic solid acids and their use in acid-catalyzed hydrocarbon reactions," Chem. Rev., 95(3)559-614, May 1995.
Cote et al., "Langmuir-Blodgett assembly of graphite oxide single layers," J. Am. Chem. Soc., 131(3):1043-1049, Jan. 2009.
Cundy et al., "The hydrothermal synthesis of zeolites: History and development from the earliest days to the present time," Chem. Rev., 103(3):663-702, Mar. 2003.
Cundy et al., "The hydrothermal synthesis of zeolites: Precursors, intermediates and reaction mechanism," Microporous Mesoporous Mater., 82(1-2):1-78, Jul. 2005.
Cussler, "Membranes containing selective flakes," J. Memb. Sci., 52(3):275-288, Sep. 1990.
Davis, "Ordered porous materials for emerging applications," Nature, 417(6891):813-821, Jun. 2002.
De Moor et al., "In situ observation of nucleation and crystal growth in zeolite synthesis. A small-angle X-ray scattering investigation on Si-TPA-MFI," J. Phys. Chem. B., 103(10):1639-1650, Mar. 1999.
De Vos Burchart et al., "Molecular mechanics studies on MFI-typezeolites: Part 4. Energetics of crystal growth directing agents," Zeolites, 13(3):216-221, Mar. 1993.
Diaz et al., "Layered zeolitic materials: an approach to designing versatile functional solids," Dalton Trans., 43(27):10292-10316, Jul. 2014.
Drews et al., "Progress in manipulating zeolite morphology and related applications," Curr. Opin. Colloid Interface Sci., 10(5-6):233-238, Dec. 2005.
Elyassi et al., "Ethanol/water mixture pervaporation performance of b-oriented silicalite-1 membranes made by gel-free secondary growth," AIChE J., 62(2):556-563, Feb. 2016.
Fan et al., "Hierarchical nanofabrication of microporous crystals with ordered mesoporosity," Nat. Mater., 7(12):984-991, Dec. 2008.

Flanigen et al., "Silicalite, a new hydrophobic crystalline silica molecular sieve," Nature, 271(5645):512-516, Feb. 1978.
Grimme, "Semiempirical GGA-type density functional constructed with a long-range dispersion correction," J. Comput. Chem., 27(15):1787-99, Nov. 2006.
Jeon et al "Ultra-selective high-flux membranes from directly synthesized zeolite nanosheets," Nature, 543(7647):690-694, Mar. 2017.
Jeong et al., "A highly crystalline layered silicate with three-dimensionally microporous layers," Nat. Mater., 2(1):53-58, Jan. 2003.
Jeong et al., "Fabrication of polymer/selective-flake nanocomposite membranes and their use in gas separation," Chem. Mater., 16(20):3838-3845, Oct. 2004.
Khaleel et al., "On the rotational intergrowth of hierarchical FAU/EMT zeolites," Angew. Chem. Int. Ed. Engl., 53(36):9456-9461, Sep. 2014.
Kim et al., "Membranes from nanoporous 1D and 2D materials: A review of opportunities, developments, and challenges," Chem. Eng. Sci., 104:908-924, Dec. 2013.
Koh et al., "Reverse osmosis molecular differentiation of organic liquids using carbon molecular sieve membranes," Science, 353(6301:):804-807, Aug. 2016.
Kokotailo et al., "Structure of synthetic zeolite ZSM-5," Nature, 272(5652):437-438, Mar. 1978.
Kolokathis et al., "Diffusion of Aromatics in Silicalite-1: Experimental and Theoretical Evidence of Entropic Barriers," J. Phys. Chem., 120(38):21410-21426, Sep. 2016.
Kresse et al., "From ultrasoft pseudopotentials to the projector augmented-wave method," Phys. Rev. B., 59(3):1758-1775, Jan. 1999.
Lai et al., "Gas and organic vapor permeation through b-oriented MFI membranes. Industrial & engineering chemistry research," Ind. Eng. Chem. Res., 43(12):3000-3007, Jun. 2004.
Lai et al., "Microstructural optimization of a zeolite membrane for organic vapor separation," Science, 300(5618):456-460, Apr. 2003.
Lee et al., "Sub-40 nm zeolite suspensions via disassembly of three-dimensionally ordered mesoporous-imprinted silicalite-1," J. Am. Chem. Soc., 133(3):493-502, Jan. 2011.
Lew et al., "Zeolite thin films: from computer chips to space stations," Acc. Chem. Res., 43(2):210-219, Feb. 2010.
Li et al., "Highly conducting graphene sheets and Langmuir-Blodgett films," Nat. Nanotechnol., 3(9):538-542, Sep. 2008.
Li et al., "Reliable fabrication of preferentially b-oriented silicalite-1 monolayers on various substrates using the Langmuir-Blodgett technique," Mater. Lett., 124:299-301, Jun. 2014.
Li et al., "The nucleation period for TPA-silicalite-1 crystallization determined by a two-stage varying-temperature synthesis," Microporous Mesoporous Mater., 31(1-2):141-150, Oct. 1999.
Li et al., "Ultrathin, molecular-sieving graphene oxide membranes for selective hydrogen separation," Science, 342(6154):95-98, Oct. 2013.
Lin et al., "Recent progress in polycrystalline zeolite membrane research," Curr. Opin. Chem. Eng., 2(2):209-216, May 2013.
Maheshwari et al., "Layer structure preservation during swelling, pillaring, and exfoliation of a zeolite precursor," J. Am. Chem. Soc., 130(4):1507-1516, Jan. 2008.
Makiura et al., "Surface nano-architecture of a metal-organic framework," Nat. Mater., 9(7):565-571, Jul. 2010.
Mintova et al., "Advances in nanosized zeolites," Nanoscale, 5(15):6693-6703, Aug. 2013.
Mitchell et al., "Structural analysis of hierarchically organized zeolites," Nat. Commun., 6:8633, Oct. 2015.
Mittal et al., "A mathematical model for zeolite membrane module performance and its use for techno-economic evaluation of improved energy efficiency hybrid membrane-distillation processes for butane isomer separations," J. Memb. Sci., 520:434-449, Dec. 2016.
Morawetz, J. Reiche, H. Kamusewitz, H. Kosmella, R. Ries, M. Noack, L. Brehmer, Colloids Surfaces a Physicochem. Eng. Asp. 2002, 198-200, 409-414.
Ohsuna et al., "Electron microscopic study of intergrowth of MFI and MEL: Crystal faults in B-MEL," J. Phys. Chem. B., 101(48):9881-9885, Nov. 1997.

(56) References Cited

PUBLICATIONS

Peng et al., "Metal-organic framework nanosheets as building blocks for molecular sieving membranes," Science, 346(6215):1356-1359, Dec. 2014.

Perdew et al., "Generalized Gradient Approximation Made Simple," Phys. Rev. Lett., 77(18):3865-3868, Oct. 1996.

Pham et al., "Gel-free secondary growth of uniformly oriented silica MFI zeolite films and application for xylene separation," Angew. Chem. Int. Ed., 52:8693-8 (2013).

Pham et al., "Growth of uniformly oriented silica MFI and BEA zeolite films on substrates," Science., 334(6062):1533-1538, Dec. 2011.

Pina et al., "Zeolite films and membranes. Emerging applications," Microporous Mesoporous Mater., 144(1-3):19-27, Oct. 2011.

Rangnekar et al., "2D zeolite coatings: Langmuir-Schaefer deposition of 3 nm thick MFI zeolite nanosheets," Angew. Chem. Int. Ed., 54(22):6571-5, May 2015.

Rangnekar et al., "Zeolite membranes—a review and comparison with MOFs," Chem. Soc. Rev., 44(20):7128-7154, Oct. 2015.

Rodenas et al., "Metal-organic framework nanosheets in polymer composite materials for gas separation," Nat. Mater., 14(1)48-55, Jan. 2015.

Roth et al., "Two-dimensional zeolites: current status and perspectives," Chem. Rev., 114(9):4807-4837, May 2014.

Sholl et al., "Seven chemical separations to change the world," Nature, 532(7600):435-437, Apr. 2016.

Snyder et al., "Hierarchical nanomanufacturing: from shaped zeolite nanoparticles to high-performance separation membranes," Angew. Chem. Int. Ed., 46(40):7560-73, Oct. 2007.

Toby et al., "GSAS-II: the genesis of a modern open-source all purpose crystallography software package," J. Appl. Crystallogr. 46(2):544-549, Apr. 2013.

Tsapatsis, "2-dimensional zeolites," AIChE J., 60(7):2374-2381, Jul. 2014.

Varoon et al., "Dispersible exfoliated zeolite nanosheets and their application as a selective membrane," Science, 334(6052):72-5, Oct. 2011.

Yoon, "Organization of zeolite microcrystals for production of functional materials. Accounts of chemical research," Acc. Chem. Res., 40(1):29-40, Jan. 2007.

Yu et al., "Zeolite membranes: microstructure characterization and permeation mechanisms," Acc. Chem. Res., 44(11):1196-1206, Nov. 2011.

Zhang et al., "Open-Pore Two-Dimensional MFI Zeolite Nanosheets for the Fabrication of Hydrocarbon-Isomer-Selective Membranes on Porous Polymer Supports," Angew. Chem. Int. Ed. Engl., 55(25):7184-7, Jun. 2016.

Zhang et al., "Synthesis of self-pillared zeolite nanosheets by repetitive branching," Science, 336(6089):1684-1687, Jun. 2012.

\* cited by examiner bis-1,5(tripropyl ammonium) pentamethylene diiodide

DIRECT SYNTHESIS OF HIGH-ASPECT RATIO ZEOLITE NANOSHEETS

CROSS-REFERENCE TO RELATED APPLICATIONS

This application claims benefit of priority from U.S. Provisional Application Ser. No. 62/411,987, filed on Oct. 24, 2016.

STATEMENT OF GOVERNMENT SUPPORT

This invention was made with government support under DE-AR0000338 awarded by Department of Energy. The government has certain rights in the invention.

TECHNICAL FIELD

This disclosure relates to zeolite membranes for use as molecular sieves.

BACKGROUND

Separation-based technologies play a significant role in industries such as chemical and petroleum refining. Membrane-based separations are often attractive due to low operating cost compared with other separation processes like distillation. In some applications, zeolite membranes are particularly attractive due to their thermal and chemical stability and potential to attain high throughput. Despite being the subject of extensive research efforts, zeolite-based membranes are often limited to small- to mid-scale industrial applications.

SUMMARY

Various aspects of the invention are summarized as follows:

In general, in an aspect, a material includes a planar layer of MFI zeolite. The planar layer has a thickness in a range between 4 nm and 10 nm for at least 70% of a basal area of the planar layer.

Implementations of this aspect can include one or more of the following features.

In some implementations, the planar layer of zeolite can have a thickness of approximately 2.5 unit-cells along the b-axis of MFI structure for at least 70% of its basal area. The planar layer can have a length of at least 0.5 µm along at least two basal orthogonal directions.

In some implementations, the planar layer of zeolite can have a thickness of approximately 3.5 unit-cells along the b-axis of MFI structure for at least 70% of its basal area. The planar layer can have a length of at least 0.5 µm along at least two basal orthogonal directions.

In some implementations, the planar layer of zeolite can have a thickness of approximately 2.5 unit-cells along the b-axis of MFI structure for at least 70% of its basal area. The planar layer can have a length of 1 µm along at least a basal direction.

In some implementations, the planar layer of zeolite can have a thickness of approximately 3.5 unit-cells along the b-axis of MFI structure for at least 70% of its basal area. The planar layer can have a length of 1 µm along at least a basal direction.

In some implementations, the material can further include a MFI zeolite particle. The particle can be embedded in the planar layer of MFI zeolite.

In some implementations, the planar layer of MFI zeolite can have a first orientation, the MFI zeolite particle can have a second orientation, and a rotational orientation of the first planar layer of MFI zeolite can be different than a rotational orientation of the MFI zeolite particle.

In some implementations, the rotational orientation of the planar layer of MFI zeolite can differ from the rotational orientation of the MFI zeolite particle by approximately 90° about a rotational axis.

In some implementations, the rotational axis can extend parallel to a basal surface of the planar layer.

In some implementations, the material can have a single planar layer of MFI zeolite and a single MFI zeolite particle embedded in the planar layer of MRI zeolite.

In some implementations, the MFI zeolite particle can have maximum dimension less than 200 nm.

In some implementations, the planar layer can have a length of at least 0.5 µm along at least two orthogonal basal directions.

In some implementations, the planar layer can define a network of pores. The network of pores can include pores having widths between approximately 5 Å and 6 Å.

In some implementations, the material can further include a porous support structure. The planar layer can be disposed on a surface of the support structure.

In some implementations, the thickness of the MFI zeolite planar layer can be measured by at least one of atomic force microscopy, electron microscopy, or x-ray diffraction.

In general, in another aspect, a method for making a MFI zeolite material includes forming a mixture comprising an aqueous solution and seed structures. The aqueous solution includes a structure directing agent and a silica precursor. Each of the seed structures includes MFI zeolite. The method also includes heating the mixture at a sufficient temperature and for sufficient time to form planar layers of MFI zeolite from the silica precursor.

Implementations of this aspect can include one or more of the following features.

In some implementations, each seed structure can be a MFI zeolite particle.

In some implementations, each MFI zeolite particle can have an average size between approximately 20 nm and 200 nm.

In some implementations, the method can further include producing the MFI zeolite particles using a structure-directing agent comprising tetrapropylammonium cations.

In some implementations, the structure directing agent can include diammonium cations, of which nitrogen atoms are connected with a chain of five carbon atoms.

In some implementations, the structure directing agent can include bis-1,5-(tripropyl ammonium) pentamethylene cations.

In some implementations, each planar layer of MFI zeolite can be attached to a respective seed structure.

In some implementations, each planar layer of MFI zeolite can encircle a respective seed structure.

In some implementations, the seed structures can be embedded in the planar layers.

In some implementations, the method can further include separating an embedded seed structure from a respective planar layer of MFI zeolite.

In some implementations, separating the embedded seed structure from the respective planar layer of MFI zeolite can include attaching the planar layer onto a substrate, and applying mechanical shear force to the planar layer to detach the embedded seed structure from the planar layer.

In some implementations, separating the embedded seed structure from the respective planar layer of MFI zeolite can include fracturing the planar layer into a plurality of layer fragments. The seed structure can be detached from at least some of the layer fragments. At least some of the layer fragments can be extracted from the seed structure.

In some implementations, separating the embedded seed structure from the respective planar layer of MFI zeolite can include sonicating the planar layer to fracture the planar layer into a plurality of layer fragments. The seed structure can be detached from at least some of the layer fragments. The layer fragments and the seed structure can be centrifuged to extract at least some of the layer fragments from the seed structure.

In some implementations, the method can further include forming a mixture including an aqueous solution and the layer fragments. The aqueous solution can include a structure directing agent and a silica precursor. The method can also include heating the mixture at a sufficient temperature and for sufficient time to increase a basal area of each layer fragment.

In some implementations, each seed structure can be a planar layer of MFI zeolite.

In some implementations, the mixture can be heated at a temperature between approximately 100° C. and 170° C., and for between approximately 1 day to 7 days.

In some implementations, the method can further include securing the planar layers to porous support structures.

In some implementations, heating the solution can forms planar layers of MFI zeolite. Each planar layer can have a thickness of approximately 5 nm for at least 70% of its basal area.

In some implementations, each planar layer can have a length of at least 0.5 µm along at least two basal orthogonal directions.

In general, in another aspect, a method for making a dense monolayer coating of planar material on porous substrate includes submerging at least one support structure in water such that a surface of the water is above an upper surface of the support structure, depositing the planar material on the surface of the water, and decreasing a level of the water such that the surface of the water passes below the upper surface of the support structure, and such that at least some of the mixture is deposited onto the upper surface of the support structure.

The details of one or more embodiments are set forth in the accompanying drawings and the description below. Other features and advantages will be apparent from the description and drawings, and from the claims.

DESCRIPTION OF DRAWINGS

FIG. 23 also includes SEM images of MFI nanosheet coatings (panels 2304, 2308, and 2312: Langmuir-Schaefer; FIG. 23, panels 2306, 2310, and 2314: floating-particle). Langmuir-Schaefer type method yielded high-density coating on Si wafer (panel 2304), but low density coating was acquired for porous SSF support (panels 2308 and 2312). In comparison, the floating-particle coating method yielded high-density coatings on both Si wafer (panel 2306) and porous sintered silica fiber supports (panels 2310 and 2314). Artificial colors were added to MFI nanosheets on SEM images to improve the clarity (panels 2312 and 2314). Inlet schematics indicate Langmuir-Schaefer deposition (panel 2304) and floating-particle coating method (panel 2306). Scale bars are 5 μm (panels 2304 and 2306), 20 μm (panels 2308, 2310), and 10 μm (panels 2312 and 2314).

DETAILED DESCRIPTION

Figure 1A:
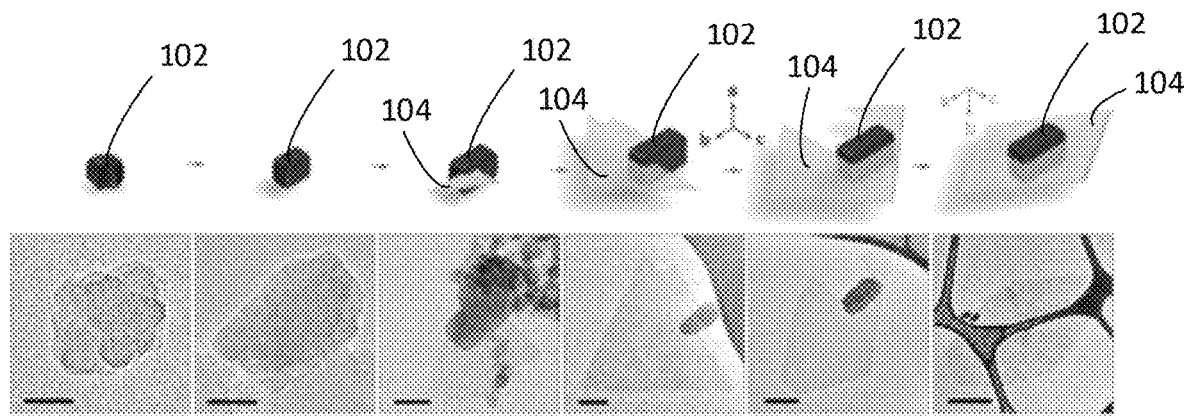
FIG. 1A shows a schematic (top) and the corresponding BF-TEM images (bottom) representing different stages of growth of MFI nanosheets starting from ~30-nm size seeds. Scale bars from left to right are 20 nm, 20 nm, 50 nm, 100 nm, 100 nm, and 500 nm.
Figure 1B:
FIG. 1B shows a schematic depicting the preferential growth of a seed along the b-axis.

"Zeolites" refer to a group of crystalline aluminosilicates. In an aluminosilicate skeleton, aluminum bonding sites generally bear negative charges. Thus, cations for compensating the negative charges are often present within pores of the aluminosilicate skeleton. The remaining space of the pores is usually filled with water molecules. The three-dimensional pore structure, shape and size of a zeolite generally depends upon the type of the zeolite, and the pore diameter is typically on a molecular scale. Therefore, a membrane of zeolite is often called a "molecular sieve" because of its size selectivity or shape selectivity for molecules entering the pores. Different zeolites may filter different molecules, according to the zeolite structure and composition.

Artificial materials based on the structure of zeolites are called zeotypes. Many zeotype molecular sieves are known in which silicon (Si) and aluminum (Al) atoms constituting the skeletal structure of zeolite are partially or wholly replaced by various other elements. Examples of known zeotype molecular sieves include porous silicalite-based molecular sieves free of aluminum, aluminophosphate molecular sieves, and other molecular sieves in which the skeletal constituent elements are partially substituted with various metal atoms such as Ti, Mn, Co, Fe and Zn. These zeotype molecular sieves are materials derived from zeolites, and do not belong to zeolite groups based on the mineralogical classification but are commonly called as zeolites in the art. Accordingly, the term "zeolite membrane" as used herein is intended to include the above-mentioned zeotype molecular sieves in addition to zeolite membranes having a skeletal structure composed only of silicon, aluminum, and oxygen or only silicon and oxygen.

Zeolite with structure type MFI has a 3-dimensionally connected pore network, which enables molecular recognition in a range that is relevant for the production of valuable chemical intermediates (e.g., between 0.5 and 0.6 nm). Therefore, MFI-type zeolites can be used in the context of various production techniques in the chemical industry. As with all zeolites, strategies to tailor them for specific applications include control of crystal size and shape. In this context, nanosheets of MFI crystals (e.g., sheets having a thickness of approximately 1-10 nanometers) can be introduced in pillared and self-pillared (e.g., "intergrown") architectures offering improved mass transfer characteristics for certain adsorption and catalysis applications. Moreover, single (e.g., "non-intergrown") nanosheets can be used to prepare thin membranes that could be used to improve the energy efficiency of separation processes.

In some cases, non-intergrown MFI nanosheets can be prepared by a multi-step approach based on exfoliation of layered MFI followed by centrifugation to remove non-exfoliated particles. However, this top-down method often can be time-consuming, costly, and low-yield and results in fragmented nanosheets with sub-micrometer lateral dimensions.

Direct (e.g., "bottom up") synthesis could provide a viable path to high-aspect-ratio zeolite nanosheets, with improved yield and at lower cost.

This disclosure describes implementations of direct synthesis of approximately 5 nm (2.5 unit cells) thick zeolite MFI nanosheets, and demonstrates their use in making membranes with improved performance. The formation of these flat, faceted and intergrowth-free nanosheets is based on a seeded growth method triggered by a single rotational intergrowth.

Figure 5B:
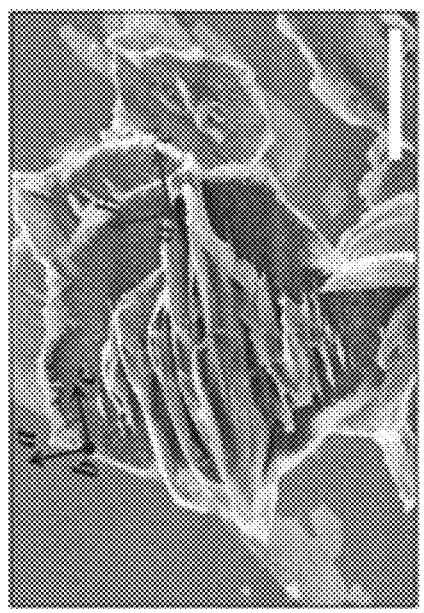
FIG. 5B shows SEM images of non-seeded growth of MFI nanosheets conducted with an identical precursor composition to that used for seeded nanosheet growth and a reaction time of 12 days. Scale bar represents 5 µm.
Figure 5D:
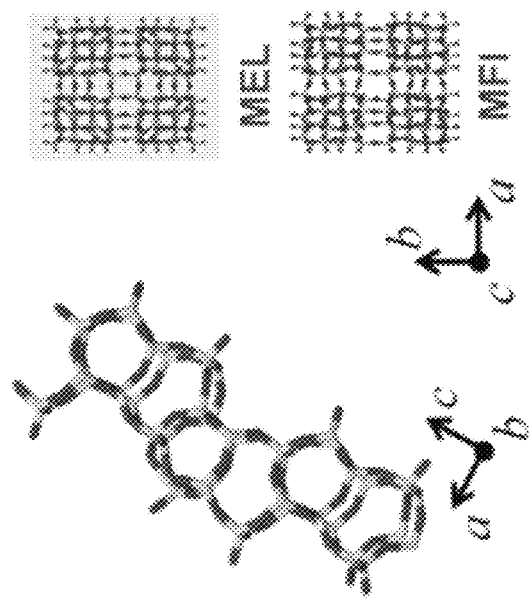
FIG. 5D shows the structure of pentasil chain and projections of MEL and MFI structures along c-axes.
Figure 5A:
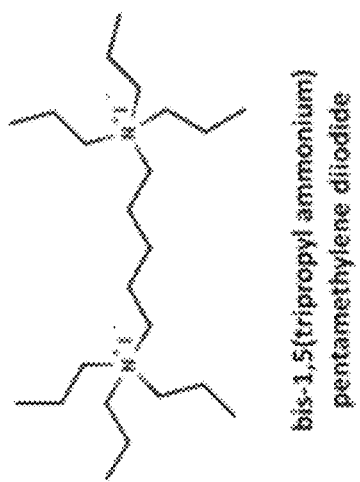
FIG. 5A shows the structure of bis-1,5(tripropyl ammonium) pentamethylene diiodide (dC5).
Figure 6A:
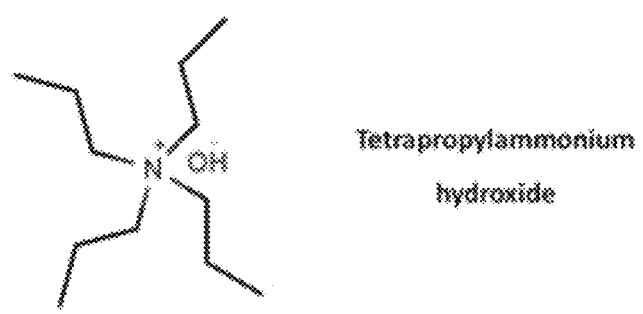
FIG. 6A shows the structure of tetrapropylammonium hydroxide.

In some cases, the direct synthesis of MFI nanosheets can be achieved by hydrothermal growth of ca. 30 nm MFI seeds (see FIGS. 1A-1G) in the presence of bis-1,5(tripropyl ammonium) pentamethylene diiodide (hereafter denoted as dC5; see FIG. 5A). In some cases, the tetrapropyl ammonium cation (TPA; see FIG. 6A) can be an effective structure directing agent (SDA) for MFI. Its dimers, like dC5 (the dimer with five methylene carbons connecting the two nitrogen atoms), yield distinct crystal morphologies depending on the length of the nitrogen-bridging alkylchains. dC5, in particular, can direct the formation of plate-like MFI with the thin crystal dimension along the b-axis, a morphology that is favorable for membrane applications, due to the presence of straight micropores along this direction. However, a direct synthesis of non-intergrown nanosheets has not been previously achieved, due in part to the formation of orthogonal intergrowths (MFI twins). In fact, the propensity for twin formation in the presence of dC5 has been exploited to create MFI crystals with hierarchical porosity (see FIG. 5B).

Figure 5C:
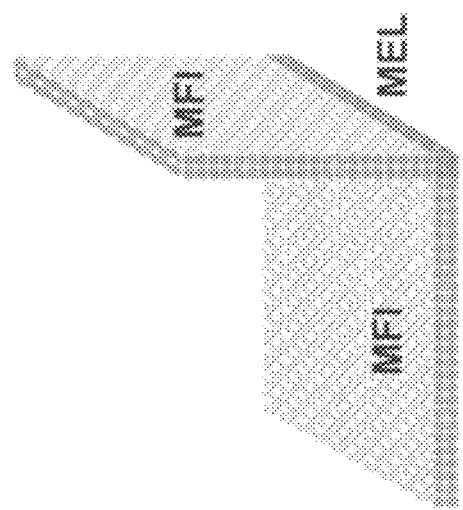
FIG. 5C shows a schematic illustration of twining via MFI/MEL intergrowth.
Figure 6B:
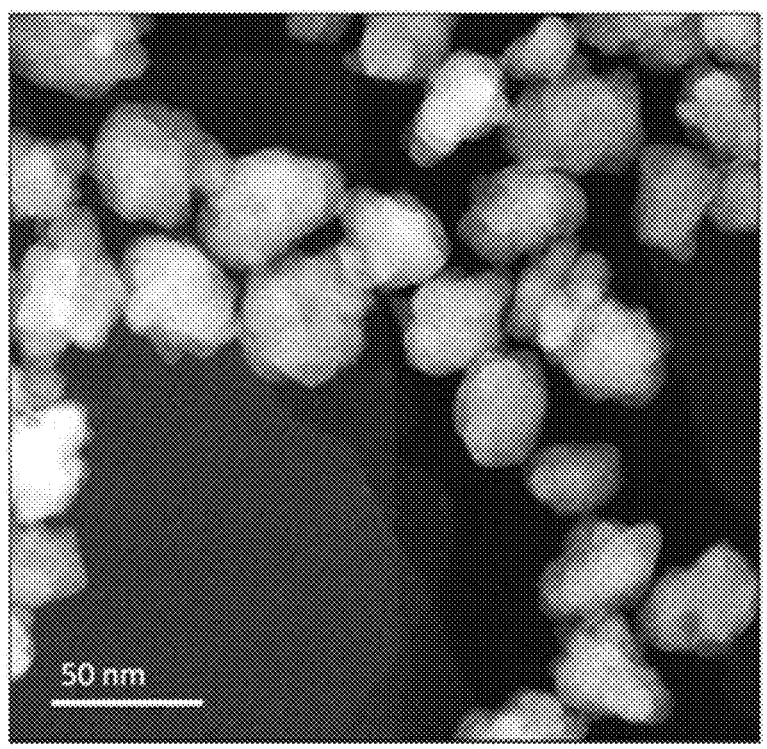
FIG. 6B shows an HAADF-STEM image of MFI seed crystals with a distribution of projected areas (right top) and a schematic illustration of crystal (right bottom). Average linear dimension of crystals based on projected area is calculated to be ~30 nm.
Figure 6B:
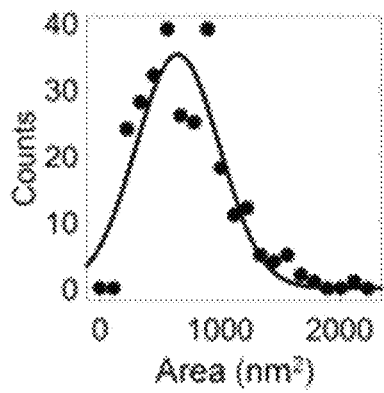
Figure 6B:
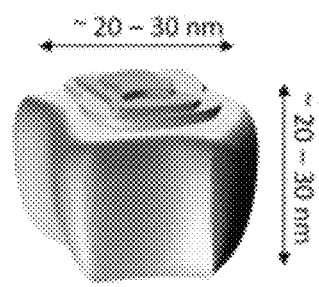

The formation of MFI and other zeolite rotational intergrowths are preceded by the intergrowth of a related zeolite structure with different symmetry. In the case of MFI, the orthogonal intergrowth is likely caused by the incorporation of the higher symmetry framework type MEL (see FIG. 5C). Insertion of MEL segments within MFI has been detected by electron microscopy, and it has been described from crystallography and crystal growth mechanism standpoints based on the placement of silicate (silicon-oxygen) chains (called pentasil chains; see FIG. 5D) along the common c-axis of MFI and MEL. MFI is formed when the pentasil chains grow so that an inversion center exists along the a-axis, while MEL is formed when the pentasil chains relate by a mirror plane. Based on the above arguments regarding arrangement of pentasil chains and our proposal that MEL domains trigger orthogonal intergrowths, we hypothesized that the emergence of orthogonal intergrowths is favored on flat, well-developed, crystal facets on which MEL-forming pentasil chain arrangements can extend along the common c-axis of MEL and MFI. Therefore, in order to avoid intergrowths, we selected to investigate seeded-growth with nanometer-sized seeds that do not have well-defined facets and, therefore, cannot support orthogonal intergrowth at early stages of growth (see FIG. 6B). Indeed, after extensive variation of synthesis conditions, we identified a synthesis window that produces zeolite nanosheets free of rotational intergrowths.

Figure 1C:
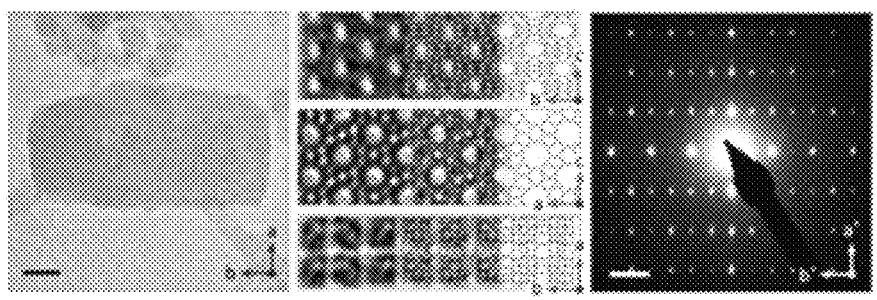
FIG. 1C shows corresponding TEM images of the seed and the HR-TEM images overlaid with the crystal structure model along [100], [010] and [001] zone axis confirming the MFI-type zeolite structure. Diffraction pattern of the seed taken along [001] zone axis confirms elongation of the seed along b-axis. Scale bars from left to right are 20 nm and 1 $nm^{-1}$.
Figure 1D:
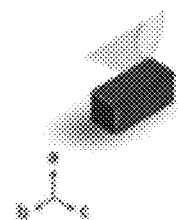
FIGS. 1D and 1E show a schematic (FIG. 1D) and HAADF-STEM images (FIG. 1E) of a nanosheet growing out of the seed. Image intensity line-scan along the dotted line in the HAADF-STEM image shows a thickness step in the nanosheet corresponding to a ratio of 5 pentasil chains to 3 pentasil chains from left to right. Scale bars from left to right in FIG. 1E are 50 nm and 20 nm.
Figure 1F:
FIG. 1F shows a schematic depicting partial wrap of a b-oriented nanosheet around a-oriented seed.
Figure 1E:
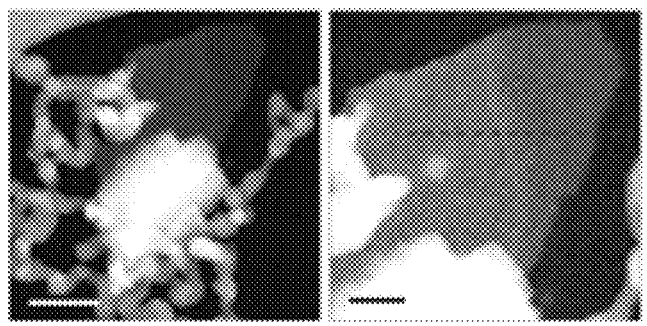
Figure 1E:
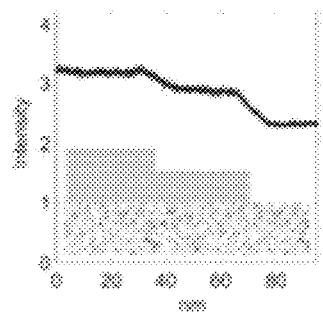
Figure 1G:
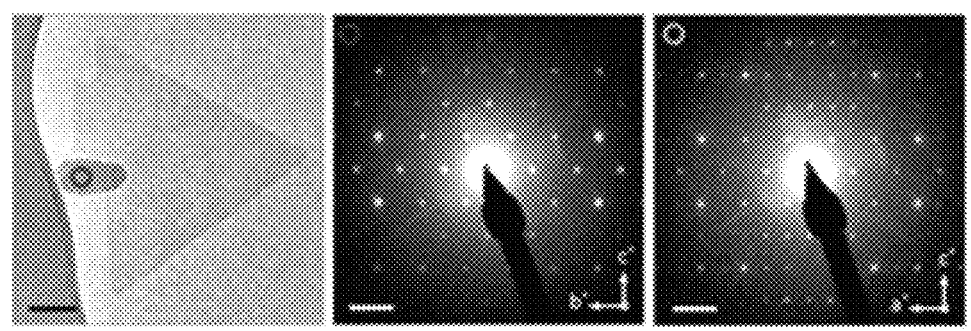
FIG. 1G shows a BF-TEM image and corresponding [100] zone axis diffraction pattern from the seed (left panel, left ring; and center panel) and [010] zone axis diffraction pattern from the sheet (left panel, right ring; and right panel). Scale bars from left to right are 100 nm, 1 $nm^{-1}$, and 1 $nm^{-1}$.
Figure 7:
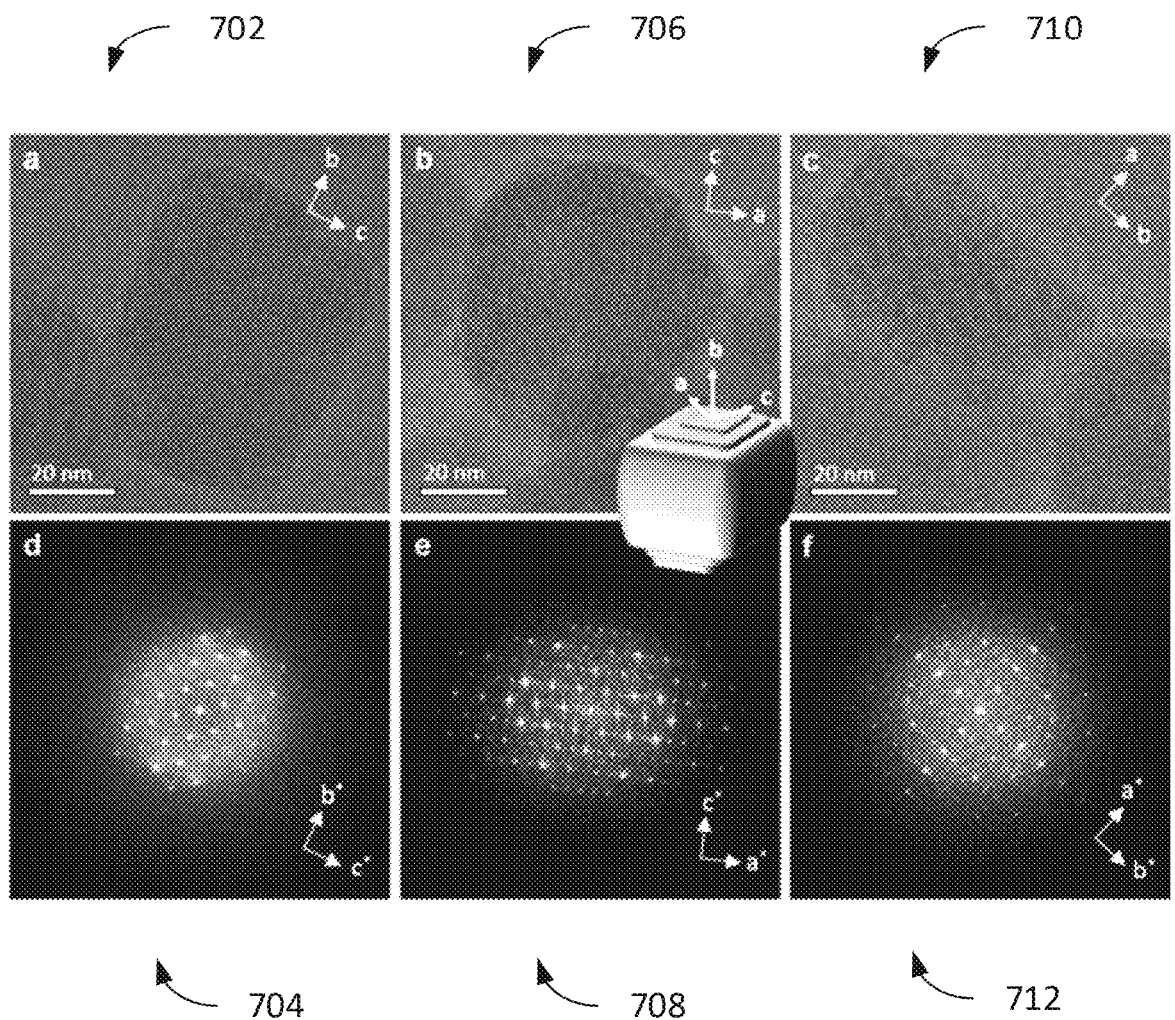
FIG. 7 shows BF-TEM image and corresponding fast Fourier transform (FFT) of seed after secondary growth with dC5 along [100] direction (panels 702 and 704, respectively); [010] direction (panels 706 and 708, respectively); and [001] direction (panels 710 and 712, respectively). Overlaid is the schematic of the seed crystal after secondary growth with dC5, where the longest dimension is along the b-axis or [010] direction.
Figure 8A:
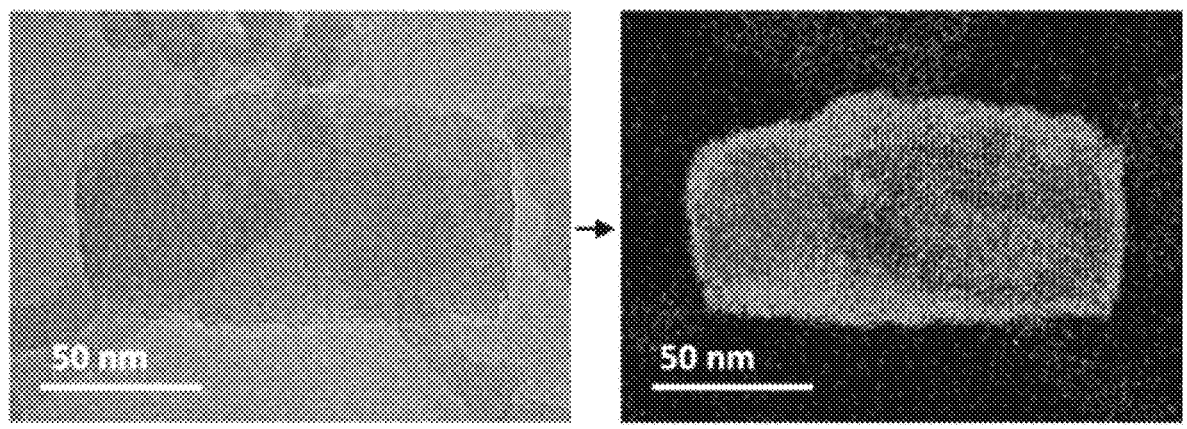
FIG. 8A shows a high-resolution BF-TEM image (left image) of grown seed (before the emergence of nanosheet) shown in FIG. 8B along c-axis. Right image corresponds to digitally processed HR-TEM image using a Sobel filter followed by thresholding and binary coloring to highlight different fringe pattern in HR-TEM image. Similarly-colored regions correspond to areas with same crystallographic orientation/thickness. Three different domains are observed in the seed.
Figure 8B:
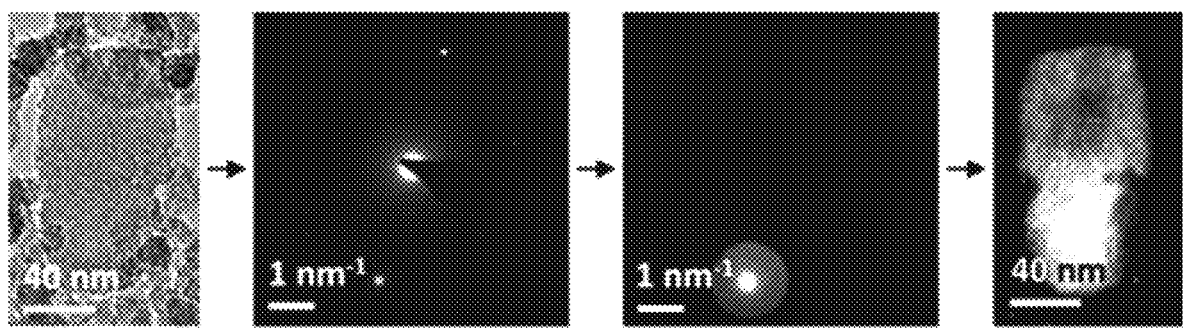
FIG. 8B depicts the procedure for obtaining dark field images of the grown seeds. BF-TEM image of a seed and its corresponding diffraction pattern are acquired. Bright diffraction spot is selected by placing the objective aperture in the diffraction plane. Dark field TEM image formed using the selected spot shows domains of different crystallographic orientation/thickness within the seed as seen in FIG. 8A.
Figure 8C:
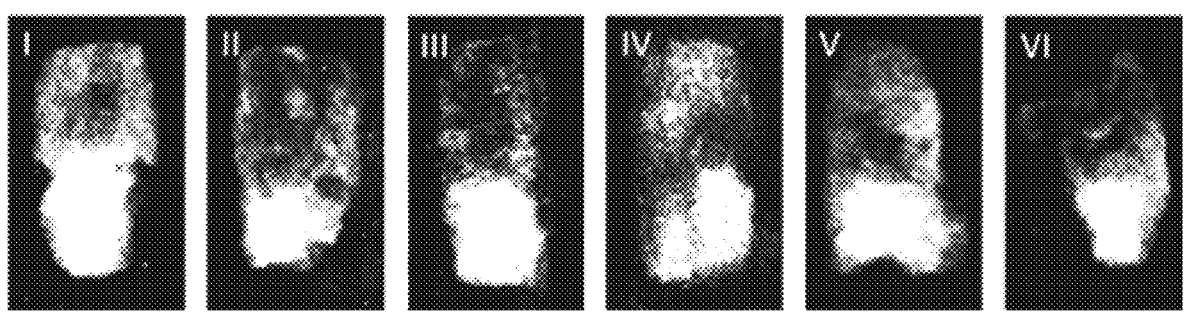
FIG. 8C shows different grown seeds (before the emergence of nanosheets) imaged in dark field mode using the method shown in FIG. 8B reveal regions of different crystallographic orientation/thickness within the seed.

FIG. 1A shows schematic illustrations and corresponding transmission electron microscopy (TEM) images of seed crystals (102) and nanosheets (104) from different growth stages. For an extended time (typically 20-40 h), the MFI nanocrystal seeds grow slowly to acquire a near-cylindrical shape (depicted in FIG. 1B). FIG. 1C shows a typical cylindrical nanocrystal grown to 140 nm in length with the corresponding electron diffraction (ED) pattern and also high-resolution TEM images along the three MFI axes of similar nanocrystals. The long axis of the cylindrical crystals is determined to be the b-axis of MFI (see also FIG. 7). Examination of several crystals at this stage of growth does not yield any evidence of rotational intergrowth, and the lack thereof supports the underlying hypothesis of this work. In most crystals examined at this stage, due to slight misorientation with respect to the remainder of the crystal, the original 30-nm seed can be made visible by dark field TEM imaging (see FIG. 7). This observation indicates that the cylindrical crystals evolve from the 30-nm seeds by epitaxial growth, and they are not newly-nucleated crystals.

Figure 2A:
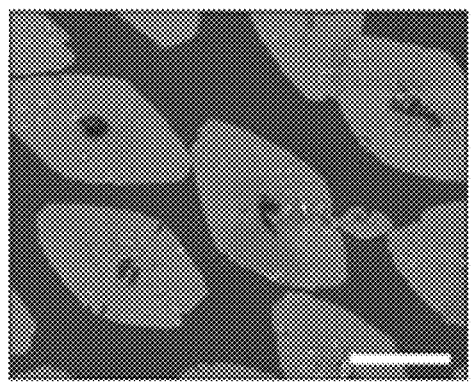
FIG. 2A shows an SEM image for MFI nanosheets. Average sizes are ~2.0 and ~1.2 µm along the a- and c-axis, respectively. Scale bar is 1 µm.
Figure 2C:
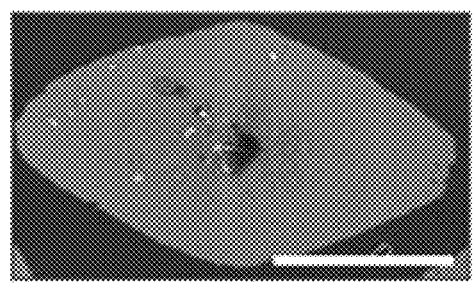
FIG. 2C shows a high-magnification SEM image for MFI nanosheet. Surface roughness of the nanosheets is due to the additional layer formation on the top of the primary nanosheet. Scale bar is 1 µm.
Figure 2B:
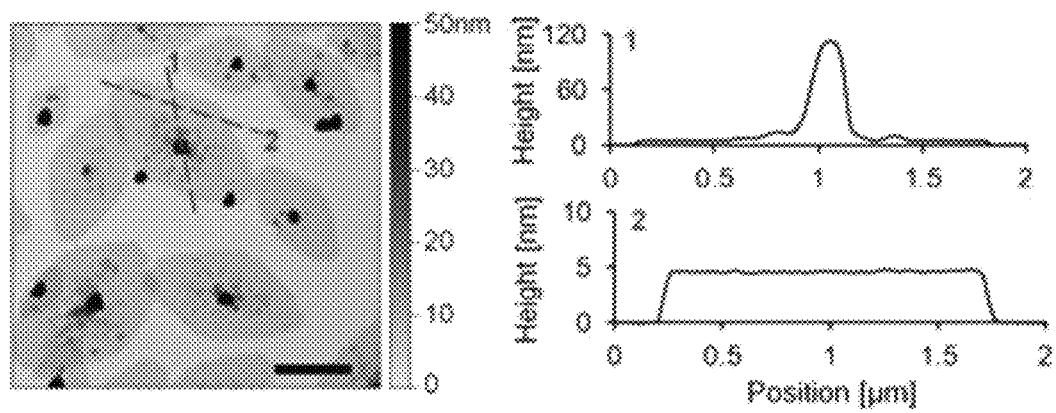
FIG. 2B shows an AFM height image (left) and height profiles (right) for MFI nanosheets. Height profiles are extracted along the dashed lines. While the seed crystal at the center possesses a size of ~100 nm, the nanosheet exhibits a very uniform thickness of 4.6±0.5 nm. Scale bar is 1 µm.
Figure 2D:
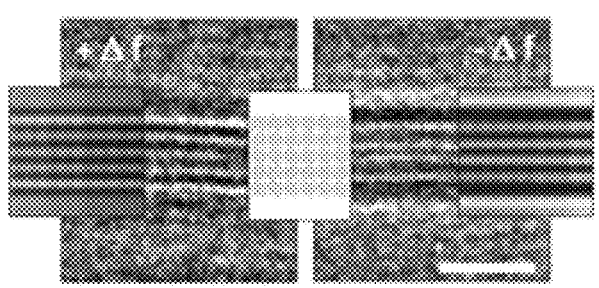
FIG. 2D shows underfocus (+Δf) and overfocus (−Δf) BF-TEM image with overlaid multislice simulations of a 5 pentasil chain thick MFI nanosheet section along b-axis. White lines in underfocus image and black lines in over focus image correspond to pentasil layers in the overlaid crystal structure model. The spacing between the black and white lines is dependent on TEM imaging condition (defocus) and is not representative of the actual bond distances between the pentasil layers. Scale bar is 5 nm.
Figure 2E:
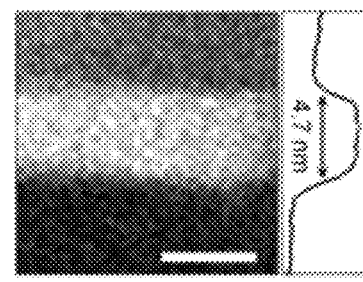
FIG. 2E shows an HAADF-STEM image of the nanosheet (bright) shown in FIG. 2D with a corresponding average intensity scan confirming the thickness of the MFI nanosheet to be 4.7 nm along the b-axis. Scale bar is 5 nm.
Figure 9:
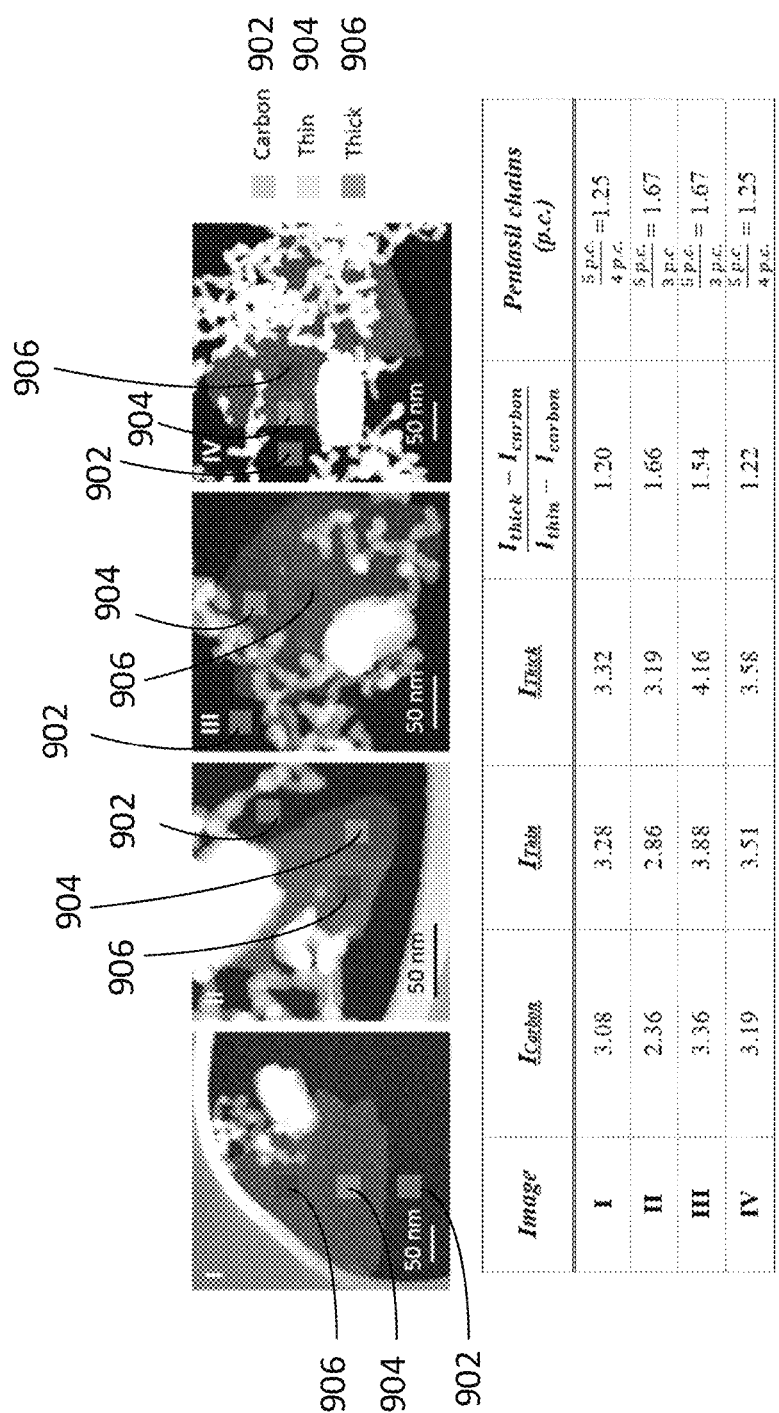
FIG. 9 shows HAADF-STEM image of partially grown sheet from the seed. Marked with markers 902, 904, and 906 are carbon background, thin and thick regions of the nanosheet, respectively. Average intensity of these marked regions is tabulated. The ratio of intensity from thick and thin regions after carbon background (from carbon support of the TEM grid) subtraction matches the corresponding ratio of either of 5/4 or 5/3 pentasil chains.
Figure 10:
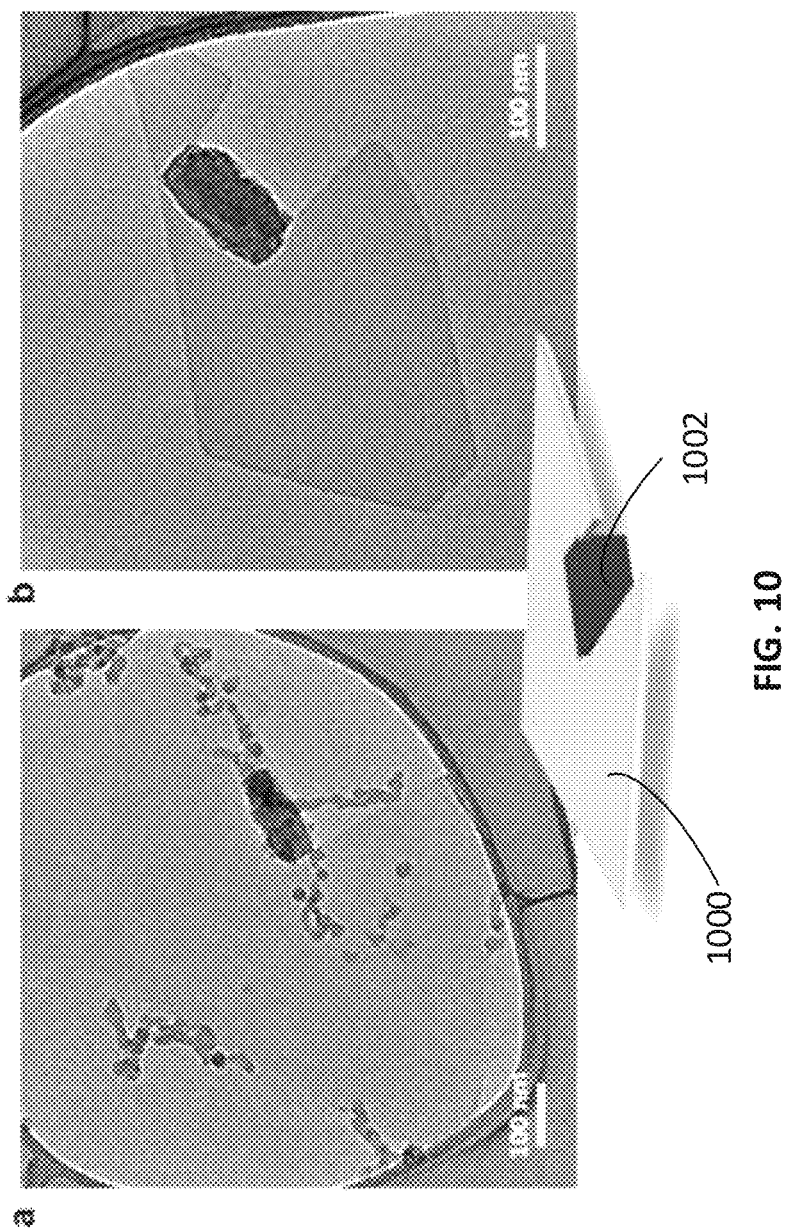
FIG. 10 shows BF-TEM images of partial wraparound of sheets around seeds. The thicker seeds appear darker while the thinner large-area nanosheets appear lighter in contrast. Overlaid is a schematic of partial wraparound of the sheet (1000) around the seed (1002).
Figure 11B:
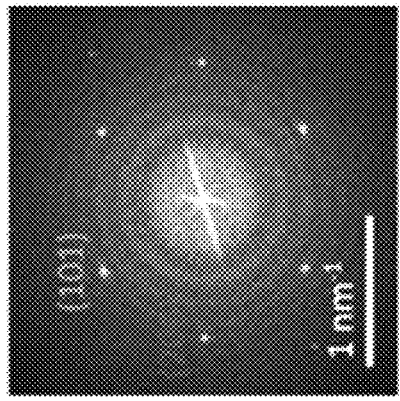
FIG. 11B shows a FFT of HR-TEM image of the sheet in FIG. 11A confirming the crystallographic directions marked in FIG. 11A.
Figure 11C:
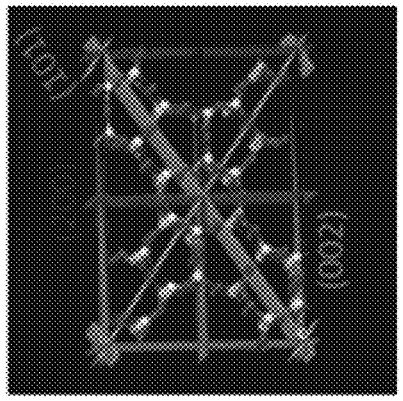
FIG. 11C shows the unit cell of MFI crystal illustrating the atomic connectivity of planes forming the edges of sheet shown in FIG. 11A.
Figure 11A:
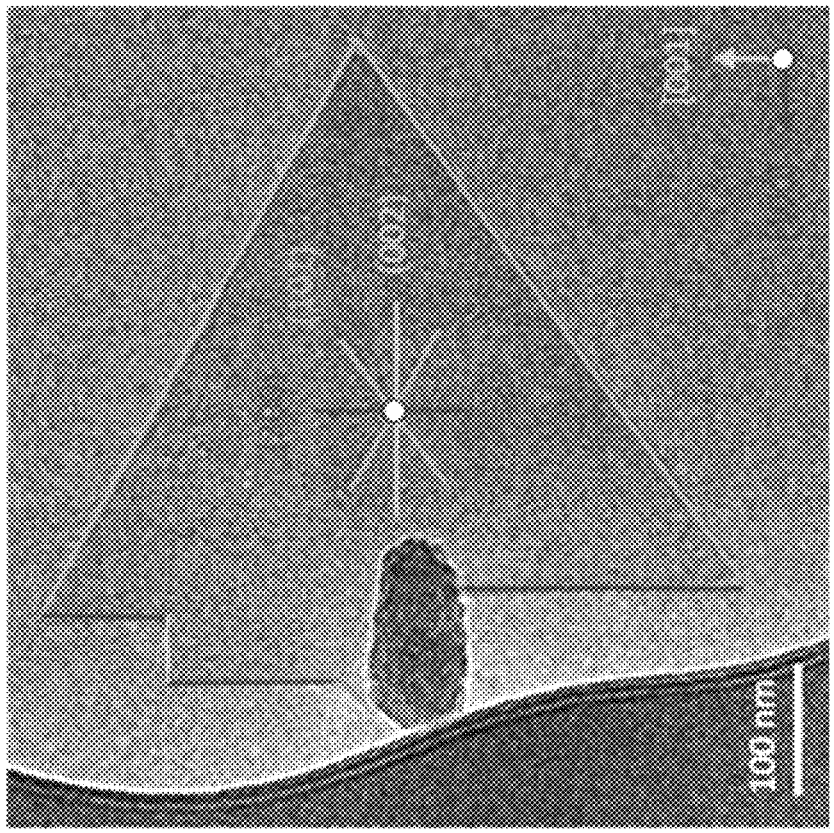
FIG. 11A shows a BF-TEM image of partial wrap of b-oriented sheet around a-oriented seed shown in FIG. 1G. Edges of the growing diamond shaped sheet are terminated by (101) crystallographic planes. Overlaid are the crystallographic planes forming different faces of the nanosheet.
Figure 12B:
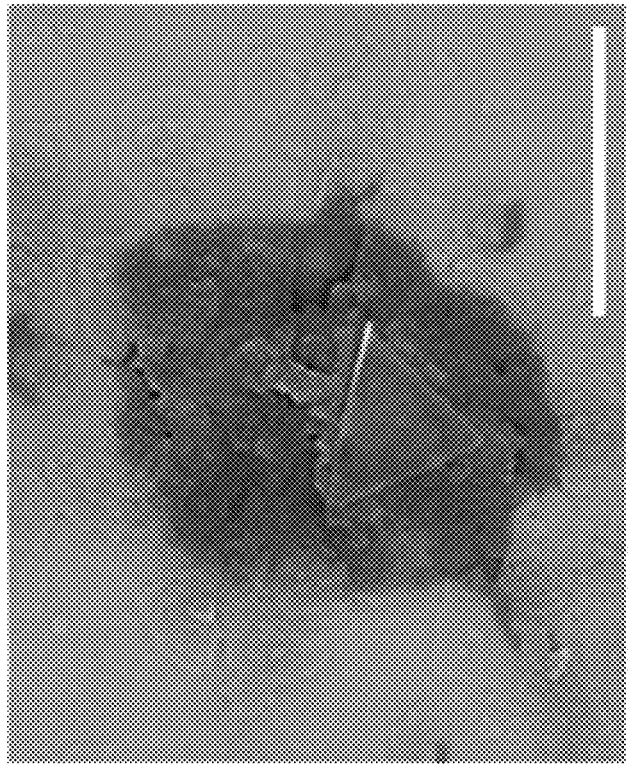
FIGS. 12A and 12B show SEM images of MFI nanosheets synthesized at 140° C. for 4 days. Additional layers formed continuously on top of the primary nanosheet, resulting in thickening of the central part. Both scale bars represent 500 nm.
Figure 12A:
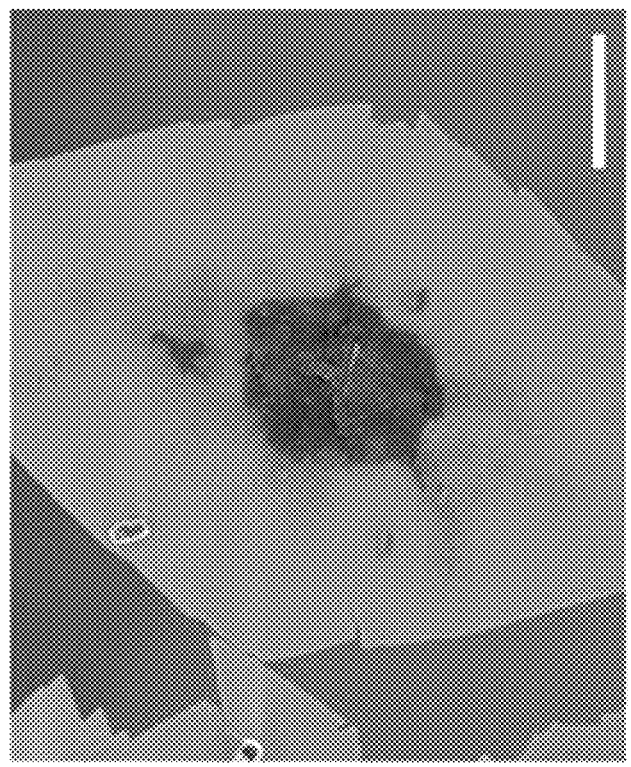
Figure 13A:
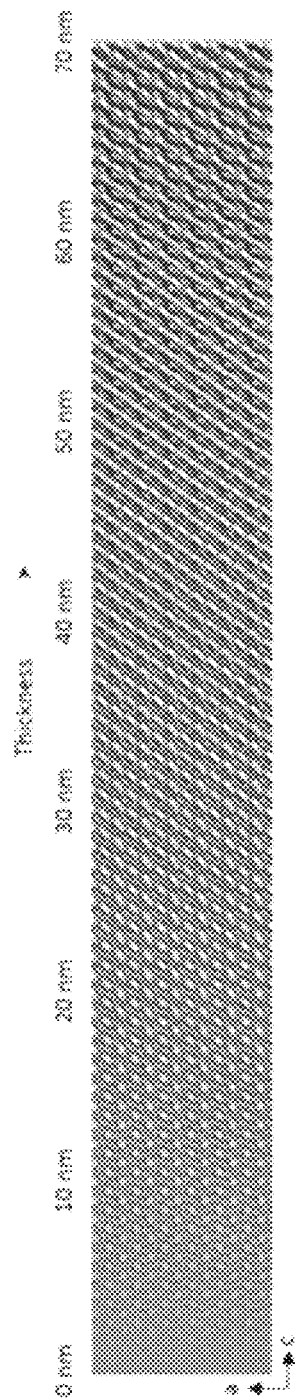
FIG. 13A shows multislice simulated BF-TEM image ($V_o$=300 kV, $C_s$=2 mm, df=100 nm) of MFI crystal with increasing thickness (left to right) in b-direction. The MFI crystal shown here has a slight mis-tilt (1.7° about [101] axis) from [010] zone axis to match experimental imaging conditions. Effect of a small mis-tilt is amplified in the HR-TEM image due to increase in thickness from left to right. Regions with 0 to 10 nm thickness demonstrate a typical [010] zone axis pattern while 20-70 nm thickness ranges exhibit complex HR-TEM image patterns.
Figure 13B:
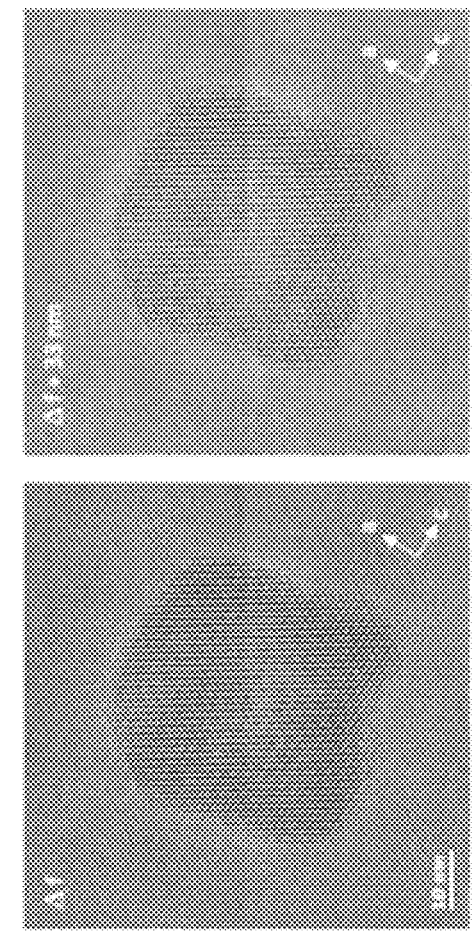
FIG. 13B shows BF-TEM images of a thick island growing epitaxially on top of the nanosheet. Image taken at defocus Δf and Δf+33 nm represent imaging conditions with the nanosheet in focus and the thick island in focus, respectively.
Figure 13C:
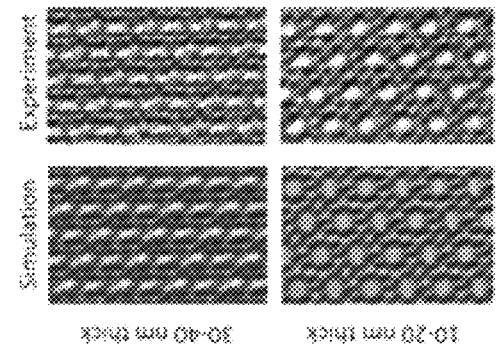
FIG. 13C shows a comparison of two different image sections taken from within the thick island HR-TEM image in FIG. 13B with multislice simulations in FIG. 13A depicting the presence of regions with thickness varying from 10-40 nm along b-direction.
Figure 13D:
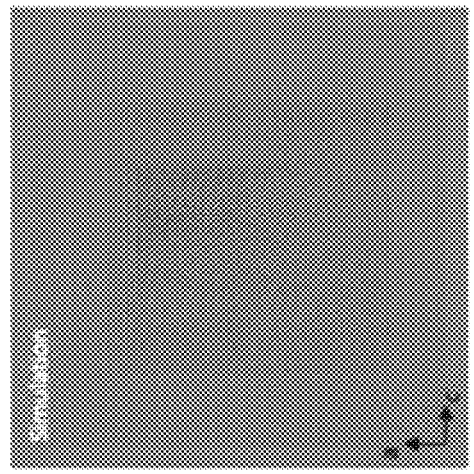
FIG. 13D shows a model of a thick island with steps of 6-10 nm in height along b-direction on a 5-nm thick nanosheet. Corresponding multislice simulation ($V_o$=300 kV, $C_s$=2 mm, df=100 nm) of MFI crystal model shows similar HR-TEM pattern as observed in FIG. 13B, thus confirming the epitaxial growth of thick regions on thin MFI nanosheet.
Figure 13D:
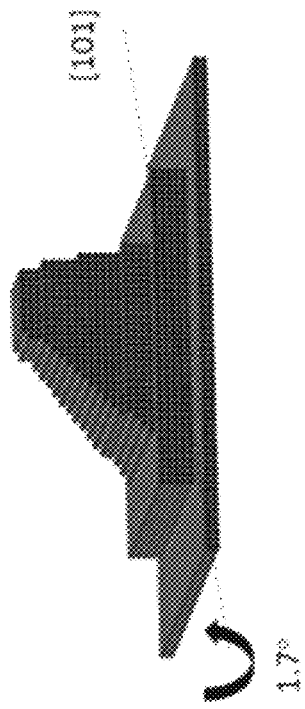
Figure 14:
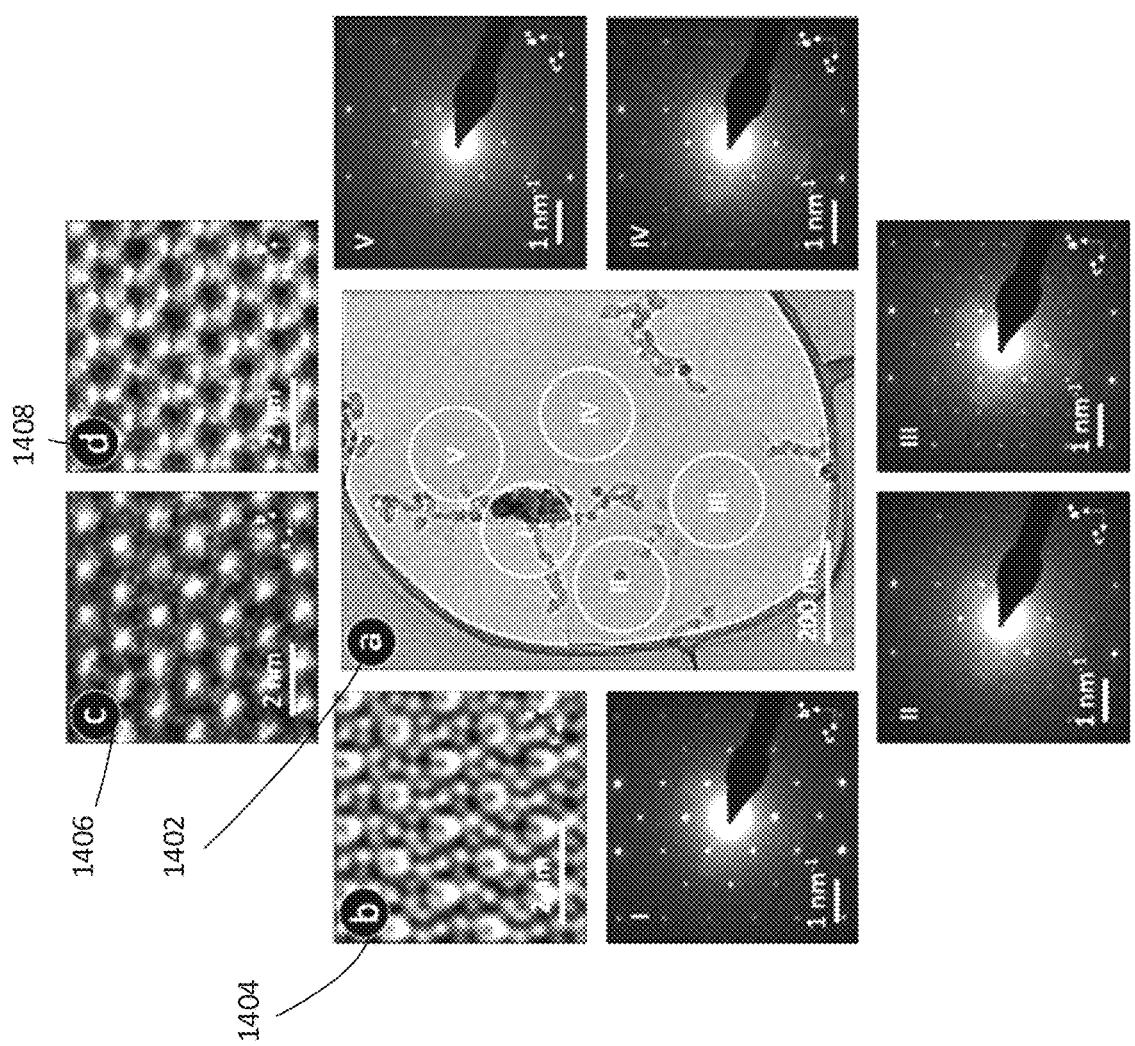
FIG. 14 shows BF-TEM image of partial wrap of nanosheet around the seed (panel 1402). Shown in white circle is region (I) enclosing the seed and its corresponding diffraction pattern confirming orientation of the seed along a-axis, region (II), (III), (IV), (V) enclosing the nanosheet and the corresponding diffraction patterns confirming b-orientation of the nanosheet. Panel 1404 shows Bragg-filtered HR-TEM image of the MFI nanosheet showing the typical [010] zone-axis pattern. Panels 1406 and 1408 show HR-TEM image of the seed oriented along [100] zone-axis taken at under-focus (panel 1406) and over-focus (panel 1408) imaging conditions. The data supports that the seed and sheet are connected via a/b twin crystallographic relationship.
Figure 22B:
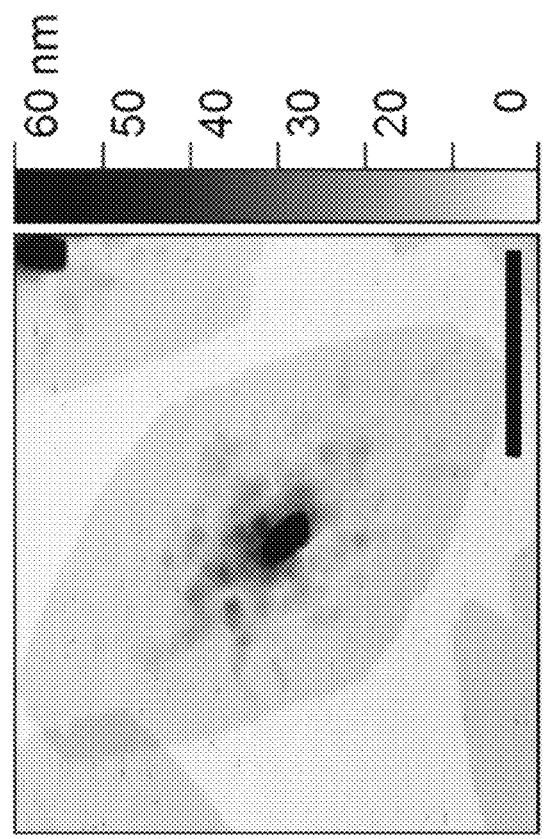
FIGS. 22A and 22B show an SEM image and an AFM height image, respectively, of nanosheets. A 5 nm-thickness nanosheet forms around MFI nanocrystal seeds and grows to ~2 μm laterally. Scale bars represent 1 μm.
Figure 22A:
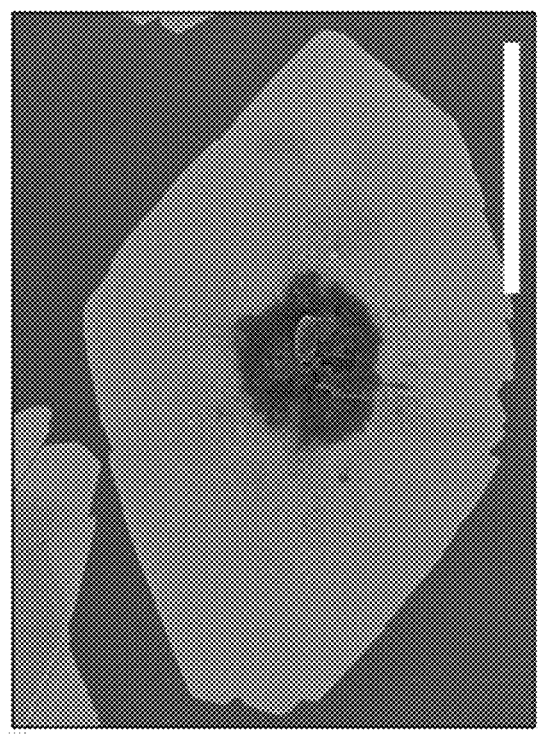

After reaching this stage of growth (typically 20-40 h), a relatively-rapid transition in crystal growth occurs (typically completed within a few hours). Nanosheets start to appear from one of the corners of the cylindrical crystals (approximately along [011], see FIGS. 1D and 1E) and then continue to grow encircling the seed to form a faceted nanosheet (see FIG. 1A). High angle annular dark field (HAADF) imaging of the emerging nanosheets reveals thickness variations between their outermost portion and the part closer to the cylindrical crystal with thickness ratio of 3/4 and 3/5 consistent with a nanosheet thickness of 3, 4 and 5 pentasil chains (see FIG. 9). As the nanosheet continues to grow, its thickness becomes uniform, and the nanosheet encircles the cylindrical seed and develops well-defined facets (see FIGS. 1A, 1F, 1G, 10, and 11A-11C). Atomic force microscopy (AFM) and electron microscopy images (see FIG. 2B) indicate that the predominant thickness of the nanosheets upon complete encirclement of the seed is 5 nm (5 pentasil chains, or 2.5 unit cell thick along the b-axis). With prolonged growth the nanosheets thicken by the nucleation of islands and slow step propagation (see FIGS. 12A and 12B). HR-TEM imaging and simulations demonstrate that the nucleated islands are MFI and that rotational intergrowths are not present on the nanosheets (see FIGS. 13A-13D). The thickening of the MFI nanosheet is becomes more noticeable at extended reaction time. FIG. 22A and FIG. 22B show a representative SEM image and AFM height image, respectively, for MFI nanosheets prepared under 4-day reaction. SEM image shows that MFI nanosheets are well faceted with ~2-μm length, and AFM height image shows that the nanosheets have a predominant (e.g., in >60% of their areas) thickness of 5 nm. The thickness gradually increases towards the center up, due to the additional layer formation. The maximum height was measured to be 120 nm, due to the presence of the seed crystal.

Figure 15B:
FIGS. 15A and 15B show TEM images of 20-nm MFI nanocrystals prepared by carbon-templates (3 DOm-i MFI) (FIG. 15A) and partially-grown MFI nanosheet emerging from these seeds (FIG. 15B). Despite the reduced initial sizes (20 nm), the sizes of the seed nanocrystals at the initial stage of nanosheet formation are ~140 nm, which is comparable to those with 30-nm seed crystals. This implies a growth of the seed crystal to a critical size is required for nanosheet formation. Scale bars represent 100 nm.
Figure 15A:
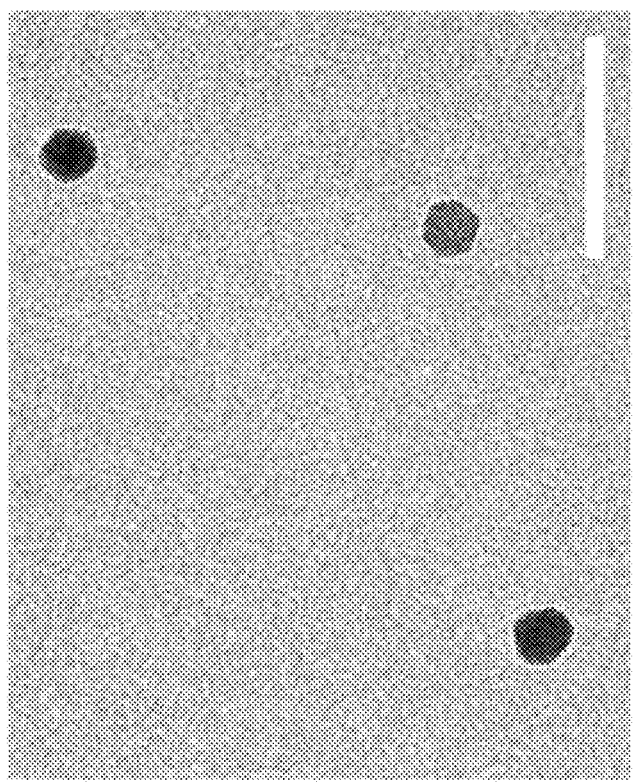
Figure 16:
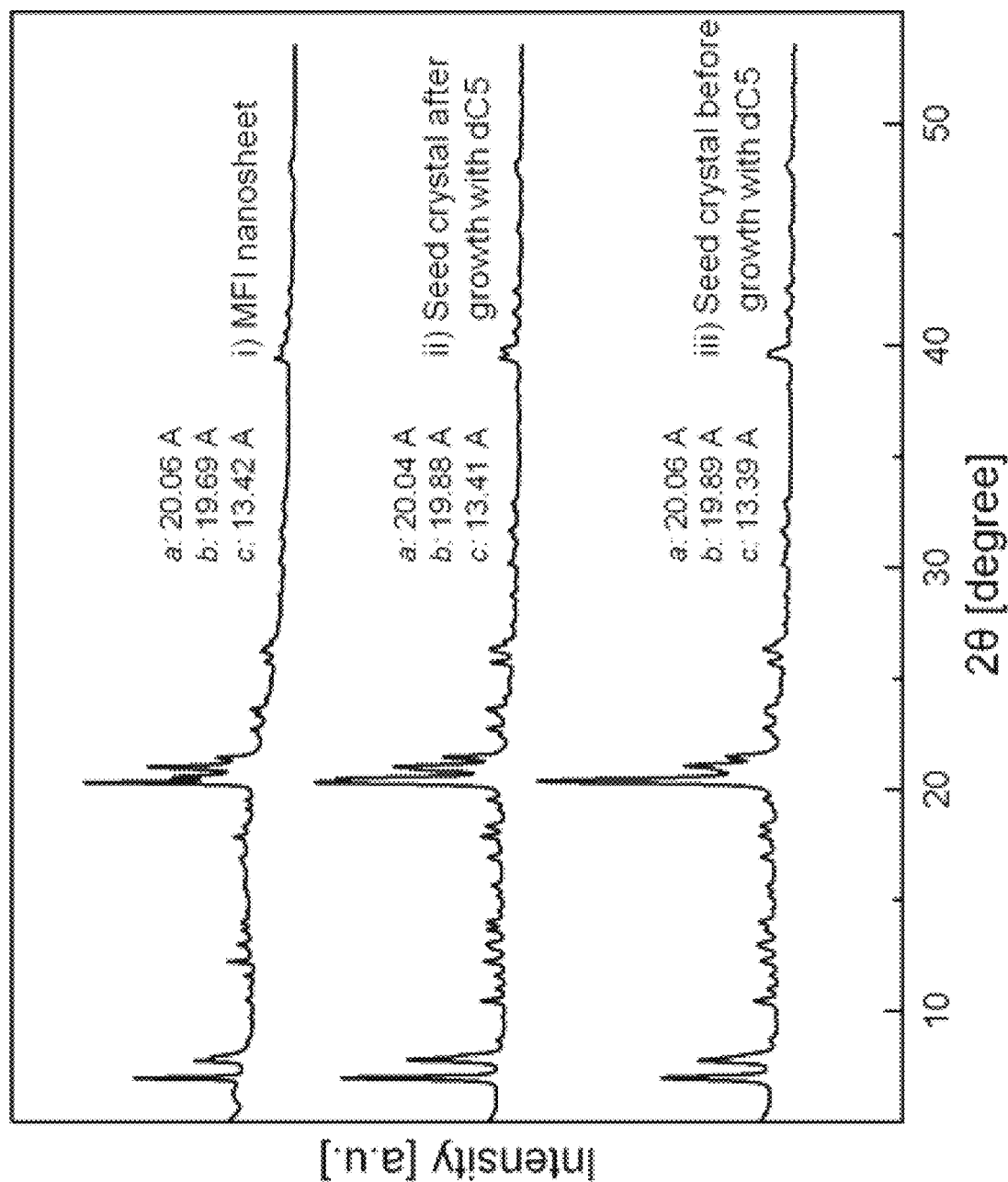
FIG. 16 shows XRD patterns for i) MFI nanosheet and seed crystals ii) after and iii) before growth with dC5. Those patterns were recorded at Beamline 17-BM of the Advanced Photon Source (APS) at Argonne National Laboratory and converted to 2θ values corresponding to Cu—Kα radiation (λ=1.54056 Å). Lattice parameters were extracted by using Pawley fitting with GSAS II software. The initial seed crystal (i) was prepared with TPAOH, resulting in a conventional MFI structure. Seed crystals after growth with dC5 (ii) and MFI nanosheets (iii) exhibit lattice parameters comparable to the seed crystal (i), which indicates dC5 yields non-strained MFI materials.
Figure 17:
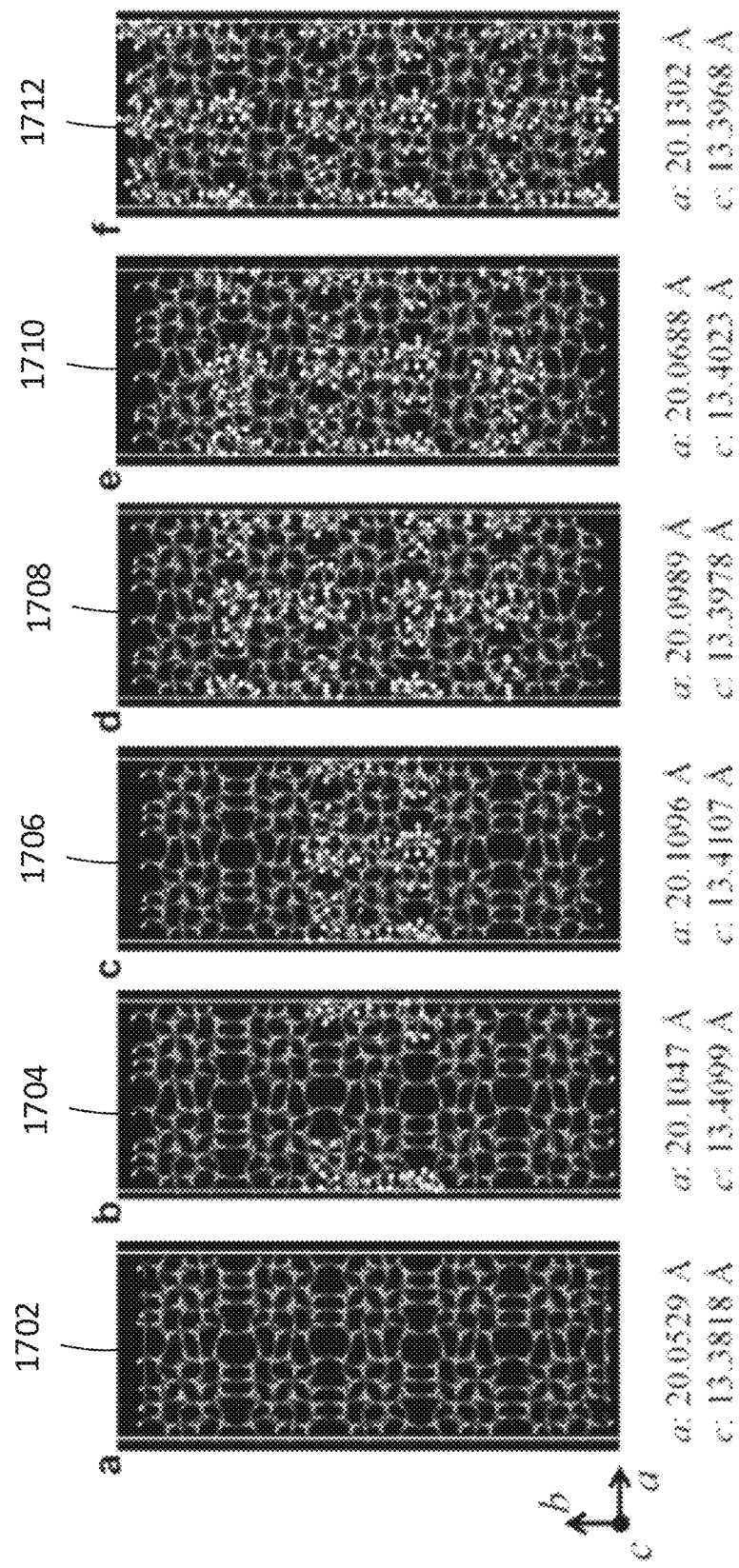
FIG. 17 shows model membrane/SDA systems obtained from Kohn-Sham density-functional theory (KS-DFT) calculations. The membrane framework consists of 1×3×1 unit cells of the MFI structure, with periodic replication in the a, c-directions and the two {010} surfaces truncated. The exposed oxygen atoms were terminated as surface silanols groups, and 30 Å of vacuum space (not shown in figure) was added to the b-direction. The empty framework (panel 1702) therefore contains five layers of pentasil chains. In addition, different configurations with up to six dC5 SDA cations per simulation cell were considered: one (panel 1704) or two (panel 1706) dC5 molecules located in the straight channels and sandwiching the center pentasil layer; four dC5 molecules, either all located in the straight channels sandwiching the second and fourth pentasil layers (panel 1708), or with two in the straight channels as in (panel 1706) and the other two in the zig-zag channels (panel 1710); and six dC5 molecules saturating the straight channels with four of them partially extending beyond the outer surfaces (panel 1712). To maintain charge neutrality of the systems, appropriate numbers of deprotonated silanol defects (SiO$^-$) were created to compensate for the SDA cations. Geometry optimizations were performed first using an empirical force field and then via KS-DFT calculations, during which the cell shape is allowed to change but the total volume is kept constant. The vacuum space present in the periodic super-cell allowed for swelling or contractions of the MFI membrane. The branching sites in dC5 molecules can only be accommodated at channel intersections, whose center-to-center separations are ~10 Å, while the distance between the two N atoms of dC5 is roughly 7.6 Å in the all-trans conformation of the pentamethylene chain. Despite this incompatibility of length scales and significant strain present in adsorbed SDA molecules, relatively minor energetic differences were found for the arrangement of SDA molecules in the straight versus zig-zag channels; for example, the model shown in panel 1710 is higher in energy than the model shown in panel 1708 by less than 0.2 kJ per mole of SiO$_2$ units. Furthermore, the strain affects SDA molecules more than the inorganic framework itself, and consequently, a, c lattice parameters lengthen by only 0.1-0.4%, while the b lattice parameter shrinks by only 0.02-0.24%.

The observations described above establish a new crystal growth modality for MFI that produces the desired high-aspect ratio nanosheet morphology. A key element of this new growth modality is the transition of crystal growth mode from one of epitaxial slow growth on a seed crystal to one that can support the emergence and rapid growth of a nanosheet. What triggers this transition? To answer this question, we investigated the crystallographic relationship between the seed and the nanosheet. Interestingly, ED patterns (see FIGS. 1F, 1G, 11A-11C, and 14) reveal an orthogonal rotational intergrowth relationship between them. They both share a common c-axis, but their a- and b-axes are rotated by 90°. When we attempted to grow nanosheets starting from smaller and smoother seeds, which we prepared by disassembly of 3 DOm-i MFI, we found a similar outcome, i.e., nanosheets emerged after the 3 DOm-i seeds grew to a similar cylindrical morphology (see FIGS. 15A and 15B). These results show that the emergence of nanosheets from the seeds is triggered by a single rotational intergrowth that takes place only after the seeds reach a certain size and shape. Apparently, until this size and shape are attained, there are no extended flat surfaces to support the intergrowth. After the rotational intergrowth is triggered, the emerging nanosheet exposes high index (h0l) facets that are highly reactive and favor fast in-plane growth until a well-faceted nanosheet is formed. As the facets approach the (001) and (101) faces of MFI, growth slows down. This self-regulation of in-plane growth rates allows for the final symmetric appearance of nanosheets despite their asymmetric genesis. The proposed kinetically-controlled emergence of nanosheets rather than a strain-induced transition is also supported by XRD data and theoretical structure optimizations. Analysis of powder XRD patterns (see FIG. 16) do not show substantial unit cell differences between seed crystals and nanosheets. This is in agreement with electronic structure calculations that indicate accommodation of dC5 in nearly strain-free MFI nanosheets (see FIG. 17).

Figure 18:
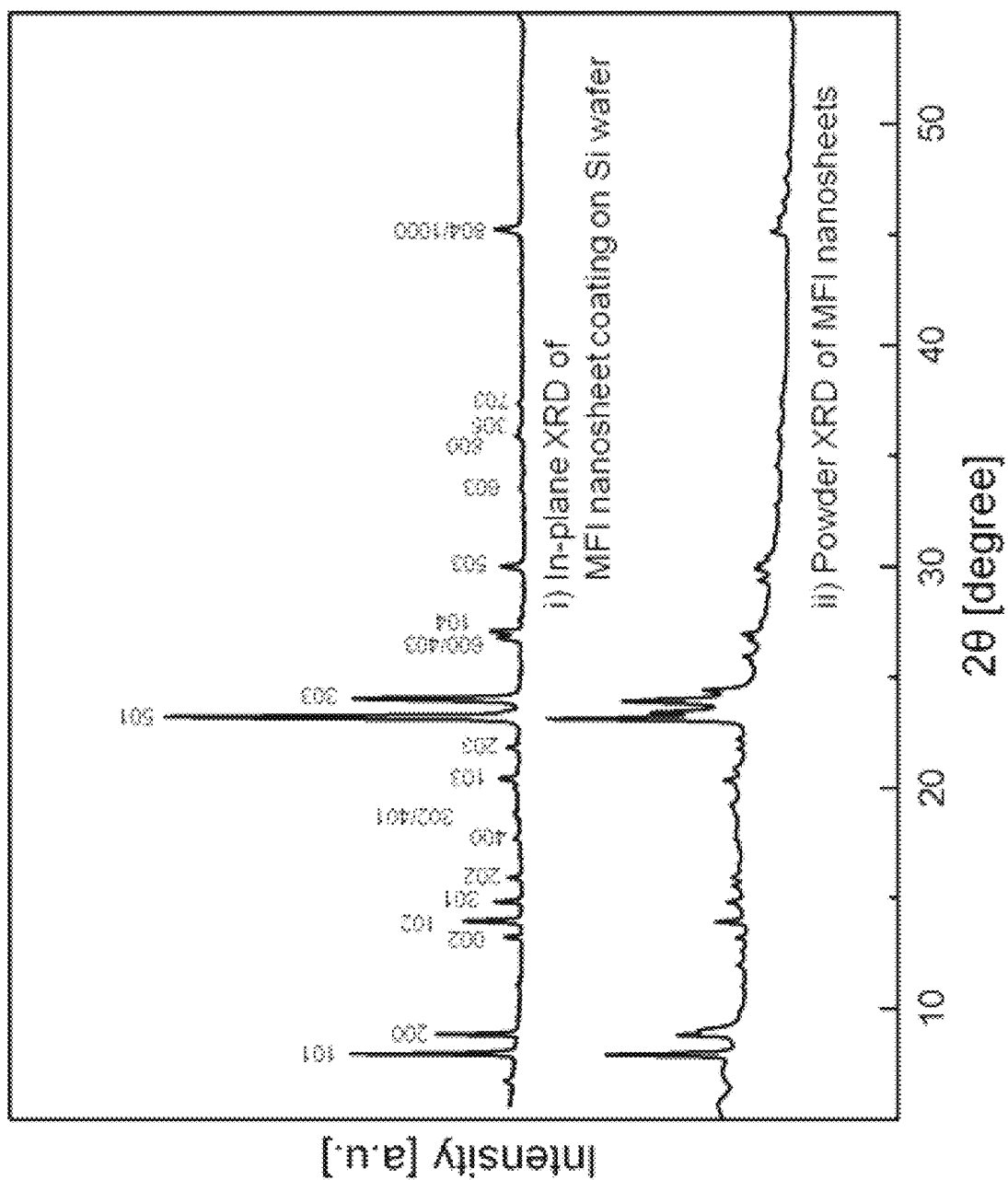
FIG. 18 shows high-resolution in-plane (i) and powder (ii) XRD patterns of MFI nanosheets. MFI nanosheet powder sample was prepared by freeze-drying. MFI nanosheets were coated on polished Si wafer, and in-plane XRD pattern was recorded (in this mode only diffraction from planes perpendicular to the support is detected). Compared to powder XRD pattern (ii), in-plane XRD pattern (i) only shows h0l reflections and establishes that MFI nanosheet coating on Si wafer is b-out-of-plane oriented.

The seeded hydrothermal growth method developed here, provides nanosheets with increased lateral dimensions and at higher yield, compared to the top-down exfoliation-based approaches, allowing the facile preparation of highly-oriented coatings (see FIG. 18). Moreover, their unique 2.5 unit-cell thickness endows these nanosheets with larger ratio of internal (micropore) versus external surface area and the ability to closer match the selective adsorption and diffusion properties of the microporous MFI framework. Indeed, the separation performance of membranes made on porous silica supports using the directly synthesized nanosheets compares favorably with membranes made by exfoliated nanosheets.

MFI membranes were fabricated by gel-free growth of the MFI nanosheet coatings on porous supports. Sintered silica fiber (SSF) supports can be prepared (e.g., as described herein), and their surfaces can be flattened by manual rubbing of 500-nm Stöber silica particles. Additionally, 50-nm Stöber silica, which serves as the silica source for the gel-free growth of MFI crystals, can be deposited on the surface. Then, MFI nanosheets were coated on SSF supports by using vacuum-assisted filtration method. The MFI nanosheet coatings were immobilized on the SSF supports by using calcination at 450° C. The filtration coating followed by immobilization was repeated until the complete nanosheet coverage was achieved. Continuous MFI membranes were then prepared by gel-free growth of MFI nanosheet seed coatings, as described herein.

Figure 3A:
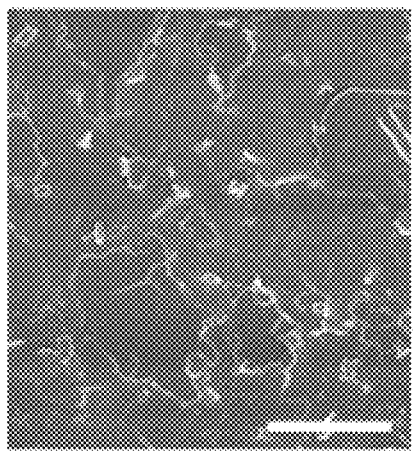
FIG. 3A and FIG. 3B show top view (FIG. 3A), and cross-sectional view (FIG. 3B) SEM images for MFI membrane prepared by gel-free inter-growth of MFI nanosheets. Scale bars represent 2 µm.
Figure 3B:
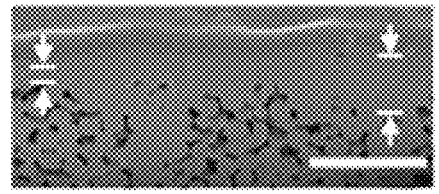
Figure 3C:
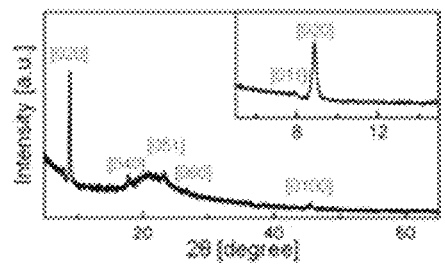
FIG. 3C shows a XRD pattern for the identical MFI membrane.

FIG. 3A is a top-view SEM image of an MFI membrane made by gel-free secondary growth of an oriented nanosheet deposit. It shows highly-intergrown flat grains that are several micrometers in lateral dimensions. The small number of 300-nm near-rectangular crystals observed at the centers of flat grains are seed nanocrystals enlarged mostly along their c-axis during secondary growth. They are oriented with their a-axis perpendicular to the membrane surface. Since they occupy only a small fraction of the surface, XRD confirms that the membrane is preferentially b-out-of-plane oriented (see FIG. 3C). It is expected that molecular transport through these membranes will be dominated by the b-oriented MFI grains formed from the nanosheets.

Figure 3D:
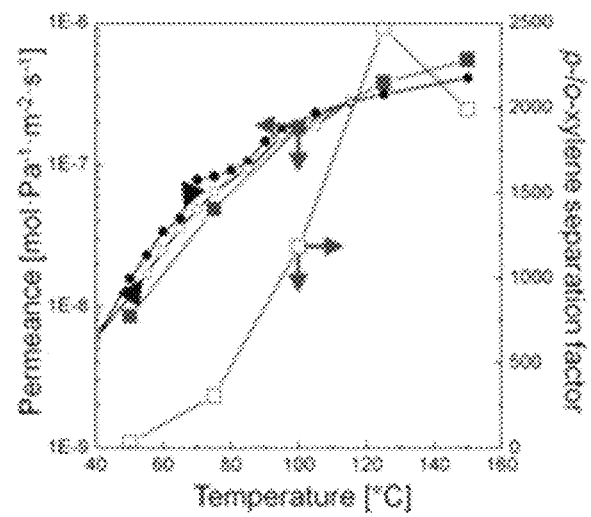
FIG. 3D depicts p-xylene permeance and selectivity for MFI membrane: p-xylene permeances from single-component permeation test measured with decreasing temperature (solid circle) and increasing temperature (empty circle), and p-xylene permeance (solid square) and separation factor (empty square) measured for 1:1 p- and o-xylene mixture.

The membrane molecular sieving properties were benchmarked using xylene isomer separation performance, which is of both practical and fundamental significance. FIG. 3D shows p-xylene permeances and separation factors (SF) in the range of 40-160° C. Single-component permeances for p-xylene measured with decreasing and increasing temperature over a period of two weeks confirmed stable and reversible membrane performance. The membrane exhibited similar high p-xylene permeances for single-component and binary mixtures (e.g., ~0.56×10$^{-6}$ mol·Pa$^{-1}$·m$^{-2}$·s$^{-1}$ at 150° C.) and a record mixture separation factor (SF) of ~2,500 at 125° C. and 2,000 at 150° C. The permeance and SF values obtained are considerably higher than those of membranes made from exfoliated nanosheets. Tests from additional membranes (see Table 1) showed that even higher SF (~8000) can be achieved. It is also important to note that a high SF was consistently observed even at low temperatures (e.g., SF of ~300 at 75° C.). Moreover, the membranes exhibited excellent p-xylene selectivity for multi-component mixtures of aromatics and good performance for n-/i-butane (SF of 50 at 25° C.) and alcohol/water mixtures (SF of 35 at 60° C.), as shown in Tables 2 and 3, respectively. This combination of high SF and high permeance for a wide range of conditions and feed mixtures can be attributed to the improved MFI membrane microstructure (thin, wide and well intergrown b-oriented MFI grains with reduced number of grain boundary defects) enabled by the high-aspect ratio 5-nm thick nanosheets.

As described herein, various filtration techniques can be used to fabricate seed coatings on porous supports. Subsequently, these seed coating can be further intergrown into continuous MFI membranes. However, in some cases, this technique may be sensitive to the porosity of the supports, and can sometimes yield poor nanosheet coverage in areas of high pressure drop (e.g., an over-sintered area).

To improve the separation performance of MFI nanosheets, MFI nanosheet monolayers can instead be formed at an air-water interface (e.g., floating on water), and transferred onto porous supports as a seed coating. In some cases, multiple coatings (e.g., three or more) can be applied to a porous support to provide a dense seed coating. This floating particle coating technique can yield more uniform and denser MFI nanosheet seed coatings on porous supports, independent from the porosity of the support. For example, MFI membranes produced using this technique can exhibit improved separation performances for xylene isomer mixtures, butane isomer mixtures, and ethanol/water. This floating particle coating technique is described in greater detail below.

Zeolite, zeolite nanosheets, MOF, graphene, and graphene oxide monolayers can be formed at an air-water interface from where they can be transferred to non-porous substrates as oriented and well-packed coatings. Here, we demonstrate an approach by which monolayers of directly-synthesized MFI nanosheets can be transferred from the air-water interface onto a porous support. When subjected to secondary growth, these oriented deposits form continuous MFI membranes with improved selectivities.

In some cases, MFI nanosheet monolayer coatings can be fabricated from aqueous dispersions by Langmuir-Schaefer type deposition. MFI nanosheets can form dense and uniform monolayers at the air-water interface, which are highly desired as seed coatings for films or membranes. The directly-synthesized MFI nanosheets can be water-compatible and do not require any post-synthesis treatment (e.g., the acid treatment required by exfoliated nanosheets) to be dispersed in water. An amount of ethanol (e.g., 5 vol %) can be added into the aqueous MFI nanosheet dispersion to facilitate the transfer of MFI nanosheets to the air-water interface. The MFI dispersion can then be added drop wise on the air-water interface in a plastic petri-dish. The monolayer can then be transferred onto a polished Si wafer by slowly lowering the horizontally placed wafer until contact with the surface water was established. Then, the Si wafer can be tilted and slowly lifted up.

Figure 23:
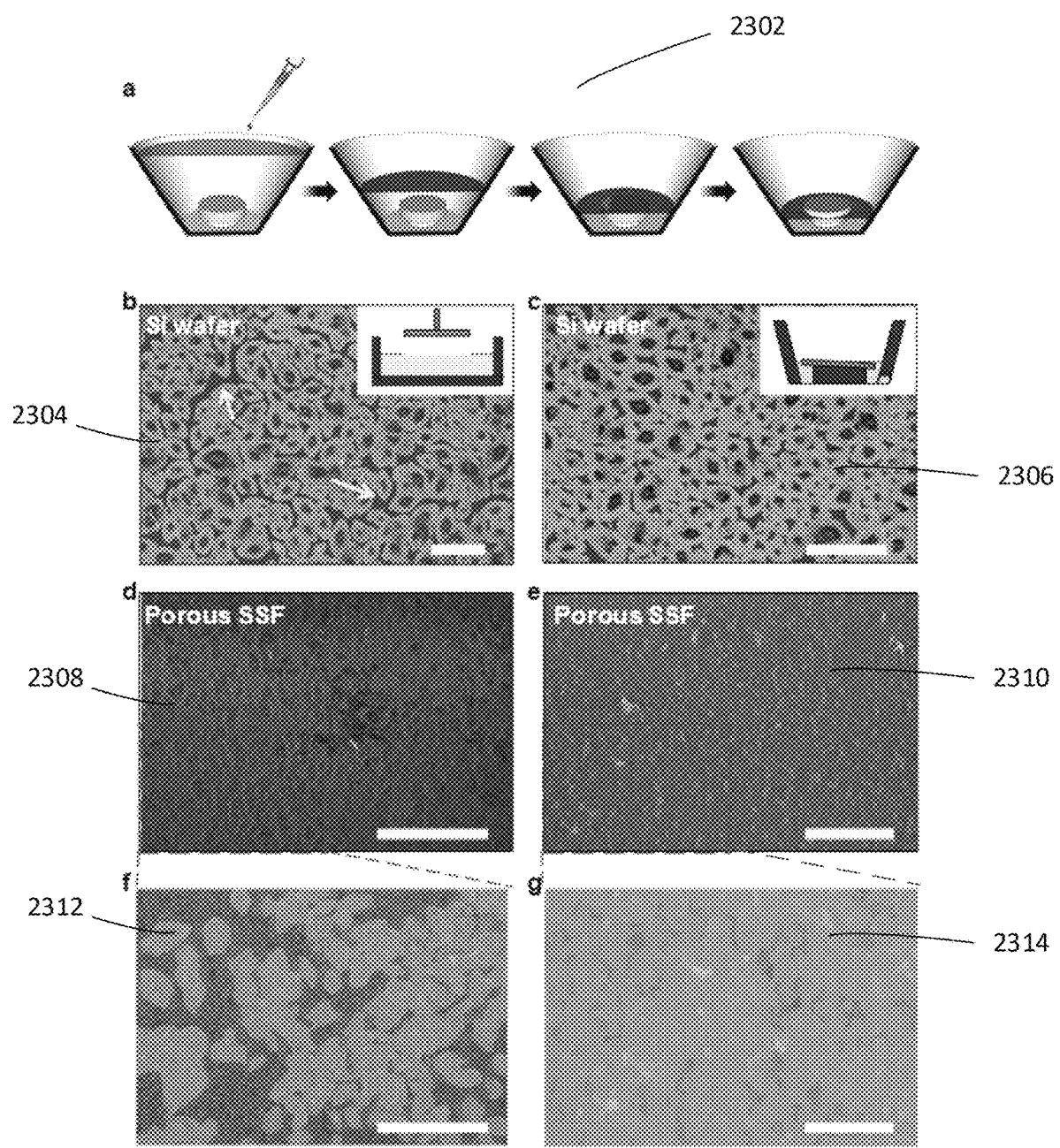
FIG. 23 includes is a schematic illustration describing an example preparation of MFI nanosheet monolayer coating by a floating-particle coating method (panel 2302). The substrate is placed at the bottom of a conical trough filled with water. Then, zeolite MFI nanosheets are spread at the air-water interface. The interface is lowered by draining the water until it falls below the substrate. The MFI nanosheet monolayer on the air-water interface is deposited on the underlying porous or non-porous substrate after experiencing isotropic compression, imposed by the conical shape of the trough.

As an example, FIG. 23, panel 2304 is a SEM image of the MFI nanosheet coating prepared by the Langmuir-Schaefer type deposition. On the Si wafer, dense MFI nanosheet coatings were consistently obtained. Parts of the nanosheets are closely packed or slightly overlapped. The small mud-crack-like gaps (see arrows in FIG. 23, panel 2304) between closely-packed nanosheets cannot be eliminated by increasing the amount of dispersion added and can be attributed to the expansion of the water surface at the moment that the contact is established with the substrate.

The identical or otherwise similar method can be used to prepare MFI nanosheet coatings on porous supports. Porous SSF support can then be coated with MFI nanosheets by using the Langmuir-Schaefer method described herein.

In some cases, however, the monolayer on the air-water interface cannot be effectively transferred on a porous support, and low-density MFI nanosheet coatings might be obtained instead. For example, FIG. 23, panel 2308 shows a SEM image of MFI nanosheet coating on a porous SSF support. Due to low contrast between the porous SSF support and MFI nanosheets, MFI nanosheets are not clearly visible on the SEM images. Therefore, artificial yellow color was applied to the MFI nanosheets (FIG. 23, panel 2312) for clarity. While closely-packed MFI nanosheets were locally observed, low-coverage nanosheet coatings were observed in the majority of the support. It is possible that water can easily infiltrate between the nanosheet and the porous SSF support and disrupt their adhesive interactions. These results led us to rethink the deposition approach and develop a new, simple, and effective approach to coat monolayers on porous supports.

FIG. 23, panel 2302 shows a schematic diagram of the floating-particle coating method. A porous SSF support can be initially placed in a water-containing conical-shape Teflon trough, and MFI nanosheet dispersion can be spread onto the air-water interface. The coating can be performed by slowly draining the water from the trough (e.g., ~1 cm/h). Due to the conical trough geometry, the area of air-water interface may diminish as the water level is lowered, increasing nanosheet density at the interface. Finally, MFI nanosheets arrive on the substrate and deposit on it, as the water level falls below the substrate. FIG. 23, panel 2306 is a SEM image of an example acquired MFI nanosheet coating on Si wafer and confirms that the floating-particle coating method yields close-packed MFI nanosheet coatings on Si wafer. As the coating is formed slower than in the instantaneous contact of the Langmuir-Schaefer method, MFI nanosheet deposition occurs in a quasi-static condition without yielding mud-crack-like gaps between the nanosheets. Moreover, this modified coating method enables the preparation of dense coatings on porous supports. FIG. 23, panels 2310 and 2312 are SEM images of the MFI nanosheet coatings on SSF supports without and with artificial yellow color added on the nanosheets, respectively. In contrast to the Langmuir-Schaefer method, the floating-particle coating method successfully transfers the monolayer from the air-water interface onto the porous SSF support.

Figure 24A:
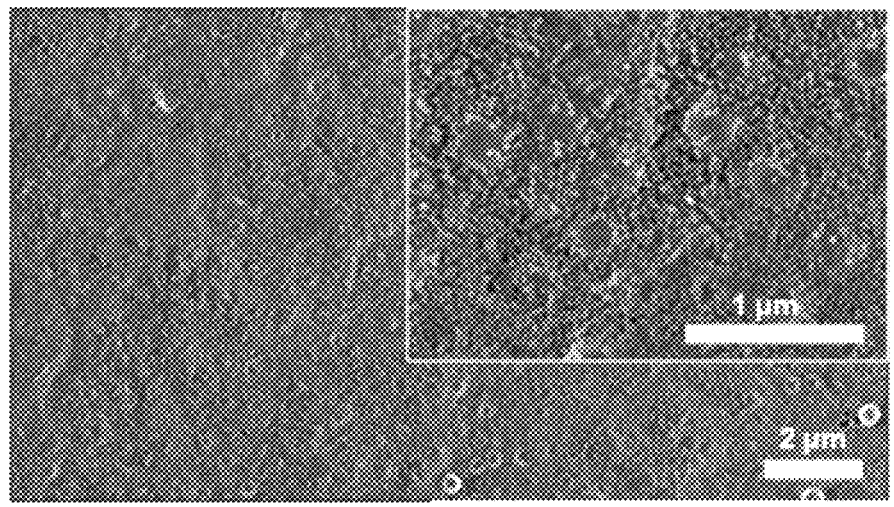
FIGS. 24A and 24B are SEM images of porous sintered silica fiber (SSF) support before and after MFI nanosheet coating by a floating-particle coating method, respectively. The surface of the support is fully covered by MFI nanosheets, and, therefore, 50-nm Stöber silica particles on the surface of the SSF support are not visible.
Figure 24B:
Figure 25A:
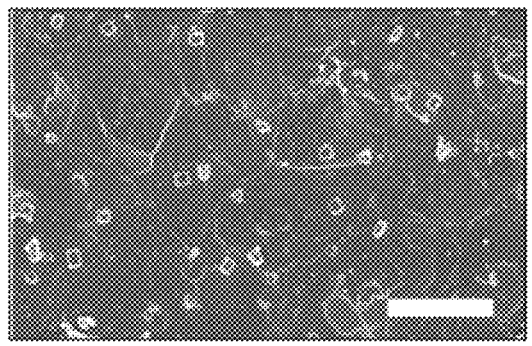
FIGS. 25A and 25B are top-view SEM images of MFI membrane fabricated by gel-free secondary growth (180° C., 4 days) of MFI nanosheet tri-layer seed coating. The thickness is in a range between 0.5-1.5 μm. Scale bars are 2 μm (FIG. 25A) and 1 μm (FIG. 25B)
Figure 25B:
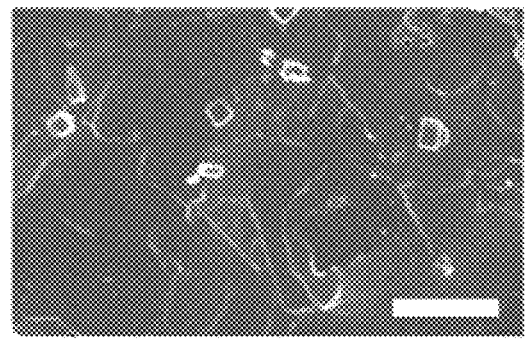
Figure 25C:
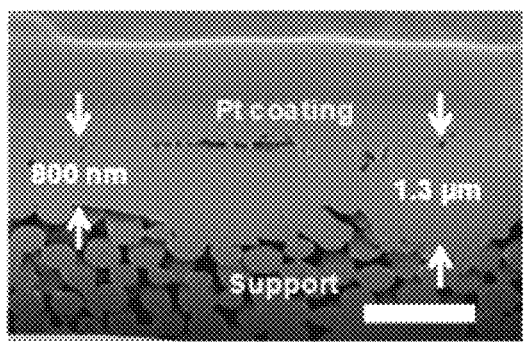
FIG. 25C is a cross-sectional SEM image of MFI membrane shown in FIGS. 25A and 24B. Scale bar is 1 μm.
Figure 25D:
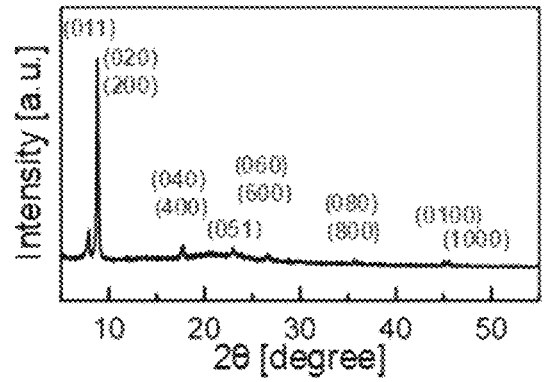
FIG. 25D is an out-of-plane XRD pattern of the membrane shown in FIGS. 25A-25C, showing predominant a- and b-out-of-plane orientation.

The MFI nanosheet coatings acquired from the floating-particle coating method are dense and uniform and are, therefore, attractive as seed coatings for MFI membranes. In some cases, after repeating the floating-particle coating method three times, full coverage of nanosheets on the support can be accomplished (e.g., as shown in FIG. 24B). After gel-free growth at 180° C. for 4 days, the MFI nanosheet coating forms a continuous membrane. For example, FIGS. 25A and 25B are SEM images of the acquired MFI membrane. The MFI nanosheets were intergrown and maintained their flat morphology, indicating that primary growth of MFI (e.g., formation of newly nucleated crystals) was suppressed under the gel-free growth condition. The smaller rectangular crystals observed at the center of grains can be attributed to the growth of the seed crystals present in the center of nanosheets. Due to the twining between seeds and nanosheets, the rectangular crystals have an a-out-of-plane orientation. Pin-hole like morphology can be observed between grains even for the extended secondary growth condition (e.g., 4 days). However, these pin-holes do not run through the membrane, as confirmed by very low $N_2$ permeance of the as-synthesized membrane (~$1.0 \times 10^{-11}$ mol $m^{-2}$ $s^{-1}$ $Pa^{-1}$). Cross-sectional SEM measurement (FIG. 25C) additionally confirmed that these holes are present only near the top surface of the membrane. The lesser growth of MFI crystals at the top surface may be due to the limited mass transport of the tetrapropylammomium structure directing agent and siliceous species through the well-packed MFI nanosheet coating during the gel-free secondary growth. The membrane thickness is between 0.5-1.5 μm. The variation in thickness can be attributed to the amount of underlying 50-nm Stöber silica, which serves as a sacrificial Si source for intergrowing the zeolite MFI nanosheets. The XRD pattern (FIG. 25D) shows a strong reflection at ~8.8° of 2θ, which can be assigned to overlapped (020) and (200) reflections and indicates that the orientation of the seed coating was maintained after the gel-free secondary growth. The existence of (200) reflection was corroborated by the presence of the (1000) reflection at ~45.6°, which is clearly distinguished from (0100) reflection. The (h00) reflections are attributed to the rectangular crystals at the center of grains, which, as discussed above, are in a/b orthogonal rotational relationship with the nanosheets.

Such thin, continuous, and oriented MFI membranes fabricated on porous supports can serve as excellent molecular sieve membranes. The ultra-selective separation performances of the membranes can be attributed to the following microstructure characteristics: 1) thin membranes yield short diffusion paths for permeate molecules and allow high permeances, 2) b-out-of-plane oriented MFI grains possess straight pore channels along their thin dimensions, lowering diffusion resistances, 3) high-aspect-ratio MFI nanosheets with large lateral dimensions (e.g., >1 μm) can effectively cover the porous supports with low amount of non-selective grain boundaries.

In addition to these advantageous properties, the floating-particle coating method can provide more uniform and dense MFI nanosheet coatings without yielding significant thickening, compared to a vacuum-assisted filtration method. The filtration method is sometimes preferred, as the flux of the solvent through the porous support induces the nanosheets to be preferentially coated on less-dense regions, and therefore, it is a self-healing coating process. However, any defect on the porous support, resulting in locally-low flux of the solvent during the filtration coating, can adversely affect the coating quality. In comparison, the floating-particle coating method can yield high-density coatings without being affected by variation of the support porosity, provided that the support surface is sufficiently flat. This method can be applicable for the deposition of other nanosheets on porous and non-porous supports.

Figure 26:
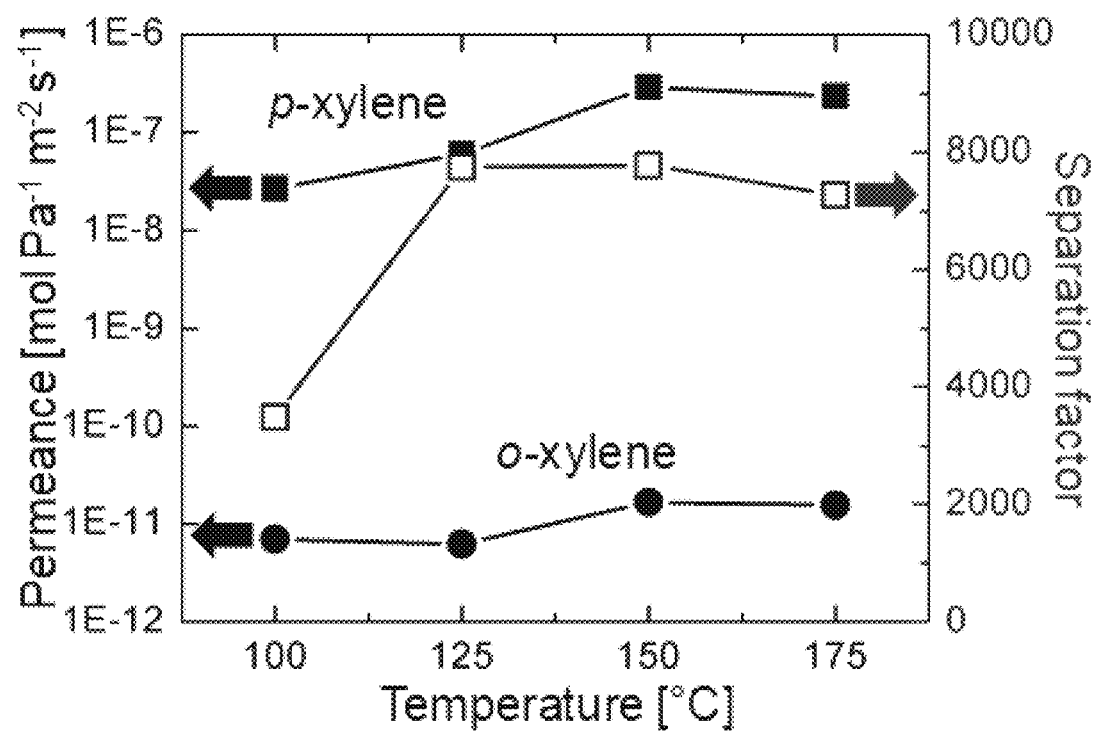
FIG. 26 shows xylene isomer separation permeances of a MFI membrane F measured at temperature ranging between 100-175° C. The MFI membrane was fabricated by gel-free growth of seed coating, prepared by using the floating particle coating method.

The separation performance of the MFI membranes fabricated by using the floating-particle coating method was evaluated using a para-/ortho-xylene isomer mixture. The xylene isomers used, p- and o-xylene, have kinetic diameters of 0.58 and 0.68 nm, respectively. According to simulation, b-oriented defect-free MFI membranes are capable of exhibiting separation factor>10,000. Permeation tests were performed for equimolar binary mixtures of p-/o-xylene (~500 Pa for each in the feed stream) at various temperatures. FIG. 26 shows p- and o-xylene permeances and corresponding separation factors of membrane F at temperatures 100-175° C. This membrane was fabricated from an MFI nanosheet coating by using gel-free secondary growth at 180° C. for 4 days after impregnating the nanosheet-seeded support with a 0.025M TPAOH aqueous solution. The membrane shows a maximum p-xylene permeance of $2.9 \times 10^{-7}$ mol m$^{-2}$ s$^{-1}$ Pa$^{-1}$ at 150° C., which is comparable to the MFI membranes prepared by vacuum-assisted filtration method. Notably, the uniform and dense MFI nanosheet coatings yielded low-defect membranes, as indicated by low o-xylene permeances, resulting in separation factors ranging from 7,000 to 8,000 at temperatures 125-175° C.

Figure 27B:
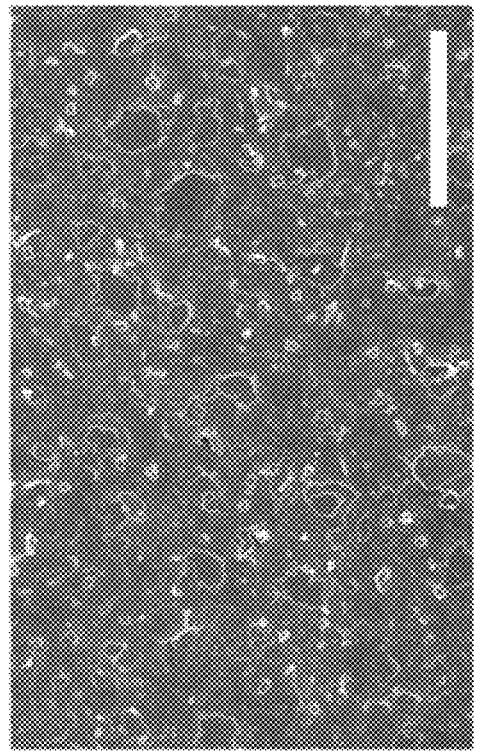
FIGS. 27A and 27B show a MFI membrane fabricated by gel-free secondary growth at 180° C. for 1 day after impregnation using a solution with composition 0.025M TPAOH/0.0025M NH$_4$F. Top-view SEM images for MFI membrane I. Scale bars are 5 μm (FIG. 27A) and 2 μm (FIG. 27B).
Figure 27A:
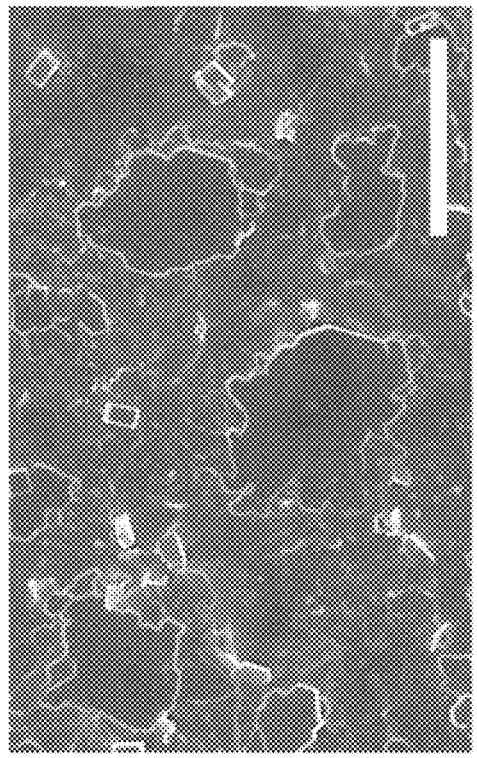

Three more membranes were fabricated from these MFI nanosheet coatings, and their separation performances at 150 and 250° C. are shown in Table 4. Membranes G and H were prepared using gel-free secondary growth conditions identical to that of membrane F and exhibit comparable p-xylene permeances at 150° C. o-xylene permeances of these membranes were diminished to a level that is not detected by our gas chromatograph equipped with flame ionization detector (GC/FID). Therefore, the separation factor, which is defined by the molar ratio of isomers in the permeate divided by that in the feed, cannot be determined for these membranes. Based on the detection limit of our GC/FID, separation factors were estimated to be higher than 10,000. Further, the membranes maintain their high selectivity at high operating temperature of 250° C. The separation performance at high operating temperature is practically important, as it is often required to achieve high permeate fluxes under high feed pressure condition. At 250° C., both membranes exhibited very small o-xylene signals, corresponding to high separation factors of ~8,000. In addition, for membrane I that was made by gel-free secondary growth using an impregnating solution with composition 0.025M TPAOH/0.0025M NH$_4$F instead of 0.025M TPAOH, only 1-day gel-free secondary growth is sufficient to yield a well-intergrown membrane, as shown by SEM images (FIGS. 27A and 27B). This membrane also exhibited comparable p-xylene permeance, which shows a maximum of $2.2 \times 10^{-7}$ mol m$^{-2}$ s$^{-1}$ Pa$^{-1}$ at 150° C. The absence of o-xylene signal was observed at both of 150 and 250° C., which can be attributed to the extended crystal growth under this modified gel-free secondary growth condition.

The separation performance of these MFI membranes was also established for n- and i-butane, the kinetic diameters of which are ~0.43 and 0.50 nm, respectively. Although the pore size of MFI membrane is larger than both of n- and i-butane, n-butane molecules are preferentially adsorbed in the pores at high loading of butane molecules and diffuse faster across the membrane than i-butane molecules, resulting in selectivity. The MFI membranes fabricated by the floating-particle coating method also exhibit high selectivity for n-/i-butane separation, as established by the separation factors of 69 and 64 for the membrane I and J, respectively (Table 5). The MFI membranes also exhibit good performances for ethanol/water pervaporation. At 60° C., the MFI membranes show ethanol fluxes ranging from 1.69-2.58 kg m$^{-2}$ h$^{-1}$ and pervaporation separation factor, $\alpha_{pervap}$, ranging from 28-46 (corresponding to intrinsic membrane selectivities, $\alpha_{mem}$, ranging from 2.6-4.4) for 5 wt % ethanol feed. The results are summarized in Table 6.

These results show that the MFI membranes fabricated by using the floating-particle coating method, which yields uniform and dense nanosheet seed coatings, exhibit ultra-high selectivities that compare favorably with those achieved by membranes fabricated using filtration coating of the identical nanosheets. The floating-particle coating method introduced here provides closely-packed nanosheet monolayers with higher density and uniformity compared to those achieved by Langmuir-Schaefer deposition and filtration methods. The benefits of this technique are demonstrated by fabricating continuous membranes based on gel-free secondary growth of zeolite MFI nanosheets that show ultra-selective performance for xylene isomer separation (e.g., with separation factor>10,000).

The techniques described herein can be used to synthesize relatively large and thin MFI nanosheets (e.g., nanosheets having a length of 1 μm or greater in the lateral dimension, and having a predominant thickness of approximately 5 nm), which may be desirable for use in particular separation applications. However, the presence of a thicker seed structure (e.g., having a thickness of approximately 100 nm) can render the nanosheet less uniform in thickness, and in some cases, can negatively impact the performance of the nanosheet.

Figure 4B:
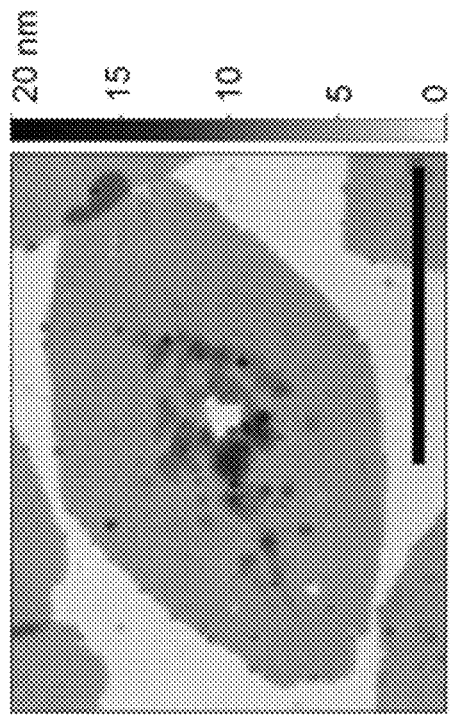
FIGS. 4A and 4B show SEM (FIG. 4A), and AFM height images (FIG. 4B) for MFI nanosheet after seed removal by mechanical rubbing. Scale bars represent 1 µm.
Figure 4A:
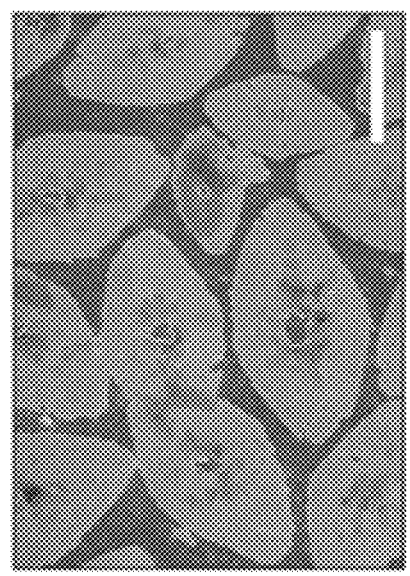
Figure 4D:
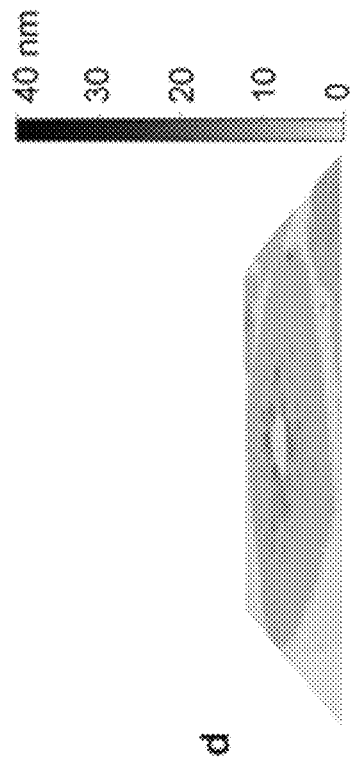
FIGS. 4C and 4D show AFM 3D height images for MFI nanosheet before (FIG. 4C) and after (FIG. 4D) seed removal. Scale bars represent 1 µm.
Figure 4C:
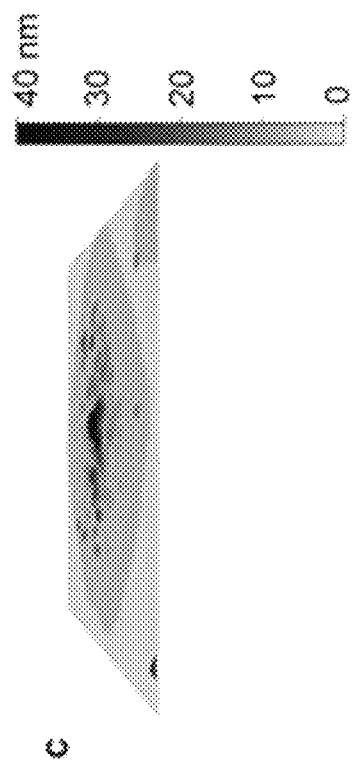

To further improve membrane performance, high-aspect ratio nanosheets can be produced with uniform thickness (e.g., without the presence of the seed at the center of the nanosheets). One approach to achieve this is to remove seed crystals by chemical and/or mechanical means. FIGS. 4A and 4B show SEM and AFM height images for MFI nanosheets after seed-crystal removal by rubbing. The SEM image confirms that the seed crystals were effectively removed, resulting in ~50-nm holes at the center of the nanosheets. FIGS. 4C and 4D are tilted-view AFM 3D images of MFI nanosheets before and after rubbing, respectively, which confirm the improved flatness of the nanosheets after rubbing.

Figure 20:
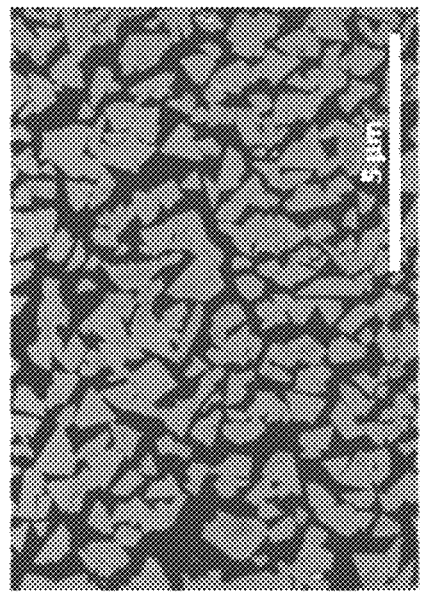
FIG. 20 shows SEM images for MFI nanosheet fragments prepared by using horn sonication and centrifugation.
Figure 20:
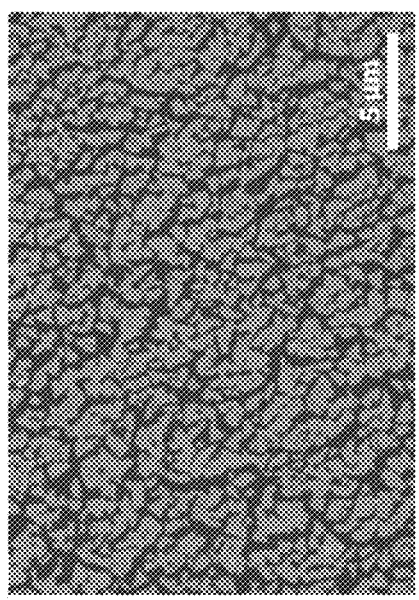

Second approach to prepare MFI nanosheets without seed crystals is to utilize fragmentation and purification. For example, a synthesized MFI nanosheet dispersion can be horn sonicated for a period of time (e.g., approximately 2 minutes) to fracture the nanosheets. The thicker portions of the nanosheets (e.g., the portions containing the thickened central parts of the nanosheets and/or the seed structures) can be separated from the dispersion using centrifugation. Thus, the thick parts can be efficiently removed, and flat and thin nanosheets can be collected. As an example, FIG. 20 shows SEM images of acquired MFI nanosheet fragments. The nanosheet fragments are irregular-shaped nanosheets with <1 μm lateral sizes, due to fracturing. Although a small number of seed crystals are still present, most of the nanosheets fragments are flat. This indicates that the process can be used to effectively remove the thick parts, including seed structures.

Figure 21:
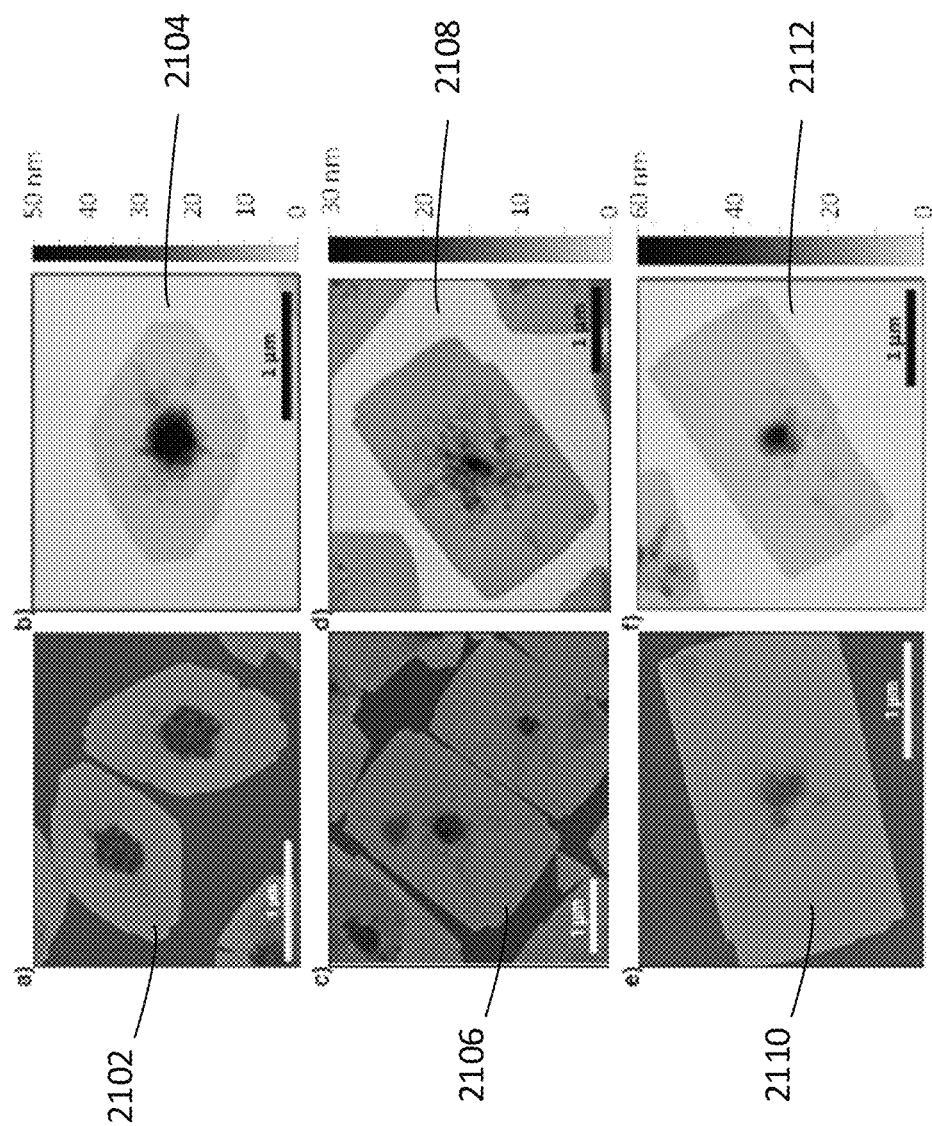
FIG. 21 shows (a,c,e) SEM images and (b,d,f) AFM height images of zeolite MFI nanosheets prepared by additional growth of the fragments. The nanosheets were synthesized at (a,b) 140° C., (c,d) 155° C., and (e,f) 170° C., showing different morphology.

As shown in FIG. 20, the MFI nanosheet fragments are more uniform in thickness. However, due to fragmentation, they are smaller with respect to their lateral dimensions. In some cases, this may be less favorable for separation applications. However, the lateral dimension of MFI nanosheets can be further increased by additional growth. For instance, nanosheet fragments can be further grown by hydrothermally treating the nanosheet fragments with a precursor sol at different temperature. As an example, FIG. 21, shows morphologies of MFI nanosheets prepared by additional growth of the fragments at (a,b) 140° C., (c,d) 155° C., and (e,f) 170° C. As shown in FIG. 21, the MFI nanosheets exhibit different morphologies, depending on the synthesis temperature. For instance, when synthesized at 140° C., the MFI nanosheets are diamond shapes (FIG. 21, panels 2102 and 2104). In comparison, when synthesized at 155° C. and higher temperature, the MFI nanosheets with rectangular shapes were acquired (FIG. 21, panels 2106, 2108, 2108, 2110, and 2112). Additionally, the predominant thickness of the nanosheet is 5 nm or 7 nm, when they are diamond shape or rectangular shape, respectively. All of three nanosheets shown in FIG. 21 do not include seed structures at the center.

Figure 19:
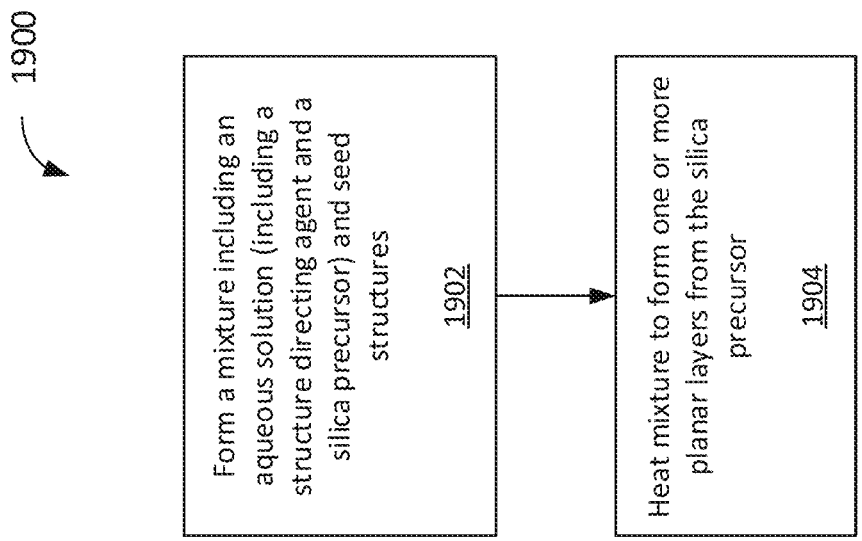
FIG. 19 is a flow diagram of an example processing for making a MFI zeolite material.

An example process 1900 for making a MFI zeolite material in shown in FIG. 19A.

The process 1900 includes forming a mixture including an aqueous solution and seed structures (step 1902). The aqueous solution includes a structure directing agent and a silica precursor.

In some cases, the structure directing agent can include bis-1,5(tripropyl ammonium) pentamethylene diiodide (dC5). In some cases, the structure directing agent can include tetrapropylammonium cations. In some cases, the structure directing agent can include diammonium cations, of which nitrogen atoms are connected with a chain of five carbon atoms. In some cases, the structure directing agent can include bis-1,5-(tripropyl ammonium) pentamethylene cations.

Each of the seed structures is an MFI zeolite particle. In some case, each seed structure can have a maximum dimension less than approximately 200 nm. In some case, each seed structure can have a maximum dimension between approximately 20 nm and 200 nm. In some cases, a seed structure can be a planar layer of MFI zeolite.

The mixture is heated at a sufficient temperature and for sufficient time to form one or more planar layers of MFI zeolite from the silica precursor (step 1904). In some cases, the mixture can be heated at a temperature of approximately 100-170° C., and for approximately 1-7 days to form the layers.

In some cases, one or more of the resulting layers can include an embedded seed structure. For example, a layer can encircle an embedded seed structure with respect to the plane of the layer. The embedded seed structures can be separated from their respective zeolite layers (e.g., by mechanical rubbing or ultrasonication).

In some cases, the embedded seed structures can be separated from their respective zeolite layers by fragmenting and purifying the zeolite layers. For example, the zeolite layers can be sonicated for a period of time (e.g., approximately 2 minutes) to fracture the zeolite layers. This fracturing detaches the seed structures from the zeolite layers. Subsequently, the seed structures can be separated from the zeolite layers through centrifugation (e.g., centrifuging a dispersion containing the fracture zeolite layers and seeds structures at 5,000 g for 1 minute). In some cases, centrifugation can be performed multiple times (e.g., 2, 3, 4, or more times). The featured zeolite layers can be extracted from the seed structures.

In some cases, the embedded seed structures can be separated from their respective zeolite layers by attaching the planar layers onto one or more substrates, and applying mechanical shear force to the planar layers to detach the embedded seed structures from the planar layers.

In some cases, the fragmented zeolite layers can be grown, such that it increases in size along one or more directions (e.g., along one or more of basal directions). For example, the fragmented zeolite layers can be mixed into an aqueous solution having a structure directing agent and a silica precursor, and heated at a sufficient temperature and for sufficient time to further increase the size (e.g., the basal area) of the fragmented zeolite layers.

In some cases, one or more of the layers can be secured to one or more porous support structures. As an example, one or more of the layers can be secured to a silica support structure.

In some cases, a layer can be secured to a support structure through a floating particle technique. For example, a support structure can be placed submerged in a container of water (e.g., a conical-shaped trough), such that a top surface of the support structure is under the water's surface. An aqueous MFI zeolite dispersion can be deposited (e.g., drop by drop) on the water's surface. The water level in the container can be reduced, such that the water's surface passes below the top surface of the support structure. Accordingly, the dispersion is deposited as a planar layer on the top surface of the support structure. The support structure can be dried (e.g., under ambient condition, or at 70° C. overnight). Further, the layers can be immobilized on the support structure by heat treatment (e.g., at 400° C. for 6 h with a ramp rate of 1° C./min). In some cases, multiple layers can be applied in this manner (e.g., two, three, four or more).

Further, the one or more of the layers can be intergrown by gel-free secondary growth (e.g., at 180° C. for 4 days using an impregnating solution with composition 0.025M TPAOH or at 180° C. for 1 day using an impregnating solution with composition 0.025M TPAOH/0.0025M NH$_4$F). For instance, the layers on the support structure can be soaked in the impregnating solution (e.g., for 5 min). Excess solution can be removed (e.g., by using Kimwipes) from the bottom surfaces of the supports. Then, the support structure can be autoclaved and heat-treated (e.g., as described herein) in the absence of any added liquid. The membrane was then calcined (e.g., at 450° C. for 8 hours with a ramp rate of 1° C./min).

The process 1900 can be used to produce an MFI zeolite material suitable for use as a molecular sieve. In some cases, the process 1900 can be used to produce a zeolite nanosheet that enables molecular recognition in a range that is relevant for the collection of certain chemical intermediates (e.g., molecular recognition between 0.5 and 0.6 nm).

In some cases, the produced material includes a planar layer of MFI zeolite. The planar layer of zeolite includes comprises a network of pores, through which molecules having particular characteristics can selectively pass. In some cases, the network of pores can include pores having widths between approximately 5-6 Å in at least one dimension.

The layer of zeolite has a predominant thickness of approximately 5 nm. In some cases, a layer of zeolite has a predominant thickness of approximately 5 nm (e.g., a thickness of between approximately 4-7 nm, 4-8 nm, 4-9 nm, or 4-10 nm along at least 70% of a planar/basal area of the layer). In some cases, each zeolite particle of the layer of zeolite particles has a unit-cell structure, and the layer of zeolite particles can have a predominant thickness of approximately 2.5 unit-cells along the b-axis of the MFI structure (e.g., along at least 70% of the planar/basal area of the layer). In some cases, each zeolite particle of the layer of zeolite particles has a unit-cell structure, and the layer of zeolite particles can have a predominant thickness of approximately 3.5 unit-cells along the b-axis of the MFI structure (e.g., along at least 70% of the planar/basal area of the layer). In some cases, the planar layer can have a length of at least 0.5 μm along at least two basal orthogonal directions. In some cases, the planar layer can have a length of 1 μm at least a basal direction. In some cases, the thickness of the layer of zeolite can be measured by atomic force microscopy, x-ray diffraction, and/or electron microscopy.

In some cases, the produced material can include a seed structure embedded in the layer of zeolite (e.g., encircled by the layer of zeolite with respect to a particular plane). The seed structure can be composed, at least in part, of MFI zeolite. The seed structure can have a length of approximately 20-200 nm in one or more dimensions.

In some cases, zeolite in the layer of zeolite can have a first unit-cell structure, and zeolite in the seed structure can have a second unit-cell structure similar to the first unit-cell structure (e.g., a MFI cell structure). When the seed structure is embedded in a corresponding layer of zeolite, the rotational orientation of the first unit-cell structure (corresponding to the layer of zeolite) can be different than a rotational orientation of the second unit-cell structure (corresponding to the seed structures). For example, the rotational orientation of the first unit-cell structure can differ from the rotational orientation of the second unit-cell structure by approximately 90° about a rotational axis. In some cases, the rotational axis can extend parallel to a planar/basal surface of the layer (e.g., along a c-axis of the crystalline structure of the layer).

The dimensions of the layer can vary. In some cases, the layer can have a width of at least 1 μm and/or a length of at least 1 μm (e.g., where the width and length are measured along respective orthogonal axes).

EXAMPLE METHODS

Example methods for synthesizing and characterizing the materials described herein are provided below. It is understood that these are merely illustrative examples.

Chemicals 1,5-diaminopentane (>97%), 1-iodopropane (98%), 2-butanone (≥99.0%), potassium carbonate (anhydrous), tetrapropylammonium hydroxide (1.0 M, aqueous), sodium hydroxide (97%), potassium hydroxide (85%), silicic acid (99.9%, 20 μm), and tetraethyl orthosilicate (98%) were purchased from Sigma-Aldrich. Ethyl acetate (99.9%) and ethyl alcohol (200 proof) were purchased from Fischer Scientific. All chemicals were used as received without any further purification.

Synthesis of bis-1,5(tripropyl ammonium) pentamethylene diiodide (dC5)

dC5 was synthesized via exhaustive alkylation of 1,5-diaminopentane with 1-iodopropane. In brief, 18.90 g of 1,5-diaminopentane and 82.35 g of anhydrous potassium carbonate were added to 450 mL of 2-butanone in a three-neck round-bottom flask. With a vigorous stirring, the reactor was slowly heated to 80° C. under argon atmosphere. The reactor was wrapped with aluminum foil to avoid iodide oxidation, and 108 mL of 1-iodopropane was added dropwise to the reactor. After 10 h of reaction under reflux, the reaction mixture was cooled and filtered to remove the potassium salts, and the solvent (2-butanone) in the filtrate was removed by rotary evaporation.

Purification consisted of two processes. The product was first dissolved in 250 ml of 2-butanone, and after 1 h stirring, equal amount of ethyl acetate was added. After overnight stirring, solid powder was recovered by filtration. Additional purification was conducted with ethanol to remove KI. The recovered solid was dissolved in minimum amount of 200 proof ethanol, then KI was removed by filtration. The product was recovered from the filtrate by using rotary evaporation. This process was repeated 4 times. The solid product was further purified with 2-butanone and ethyl acetate, followed by 200 proof ethanol, as described above. Purity was confirmed by $^{13}$C NMR.

Preparation of MFI Seed Crystals

MFI seed crystals were synthesized based on a two-stage varying-temperature synthesis with a sol composition of $10SiO_2:2.4TPAOH:0.87NaOH:114H_2O$. Typically, 8.93 g of 1.0 M TPAOH solution was mixed with 0.16 g of deionized (DI) water and 0.127 g of sodium hydroxide. After complete dissolution of sodium hydroxide, 2.5 g of silicic acid was added as the silica source. The mixture was stirred overnight at room temperature and then heated at 50° C. in an oil bath under static condition. After 6 days, the solution was filtered with 0.45-μm GHP (polypropylene) syringe filter, and the filtrate was heated without stirring at 100° C. in an oil bath for 3 days.

MFI seed crystals were washed with DI water before the MFI nanosheet synthesis. The MFI crystals were collected by centrifugation at 14,500 RCF (Relative Centrifugal Force) for 1 h followed by decantation. The solid was re-dispersed in DI water by using ultra-sonication. After repeating the washing process twice, the solid content of the dispersion was determined based on weight after drying an aliquot of the dispersion.

MFI Nanosheet Synthesis

MFI nanosheets were synthesized based on the seeded growth with dC5 as SDA. Typically, a precursor sol with a composition of $80TEOS:3.75dC5:20KOH:9500H_2O$ was hydrolyzed at room temperature under air purging (50 mL/min) to reduce ethanol content and therefore to promote MFI crystallization. After 16 h, the precursor sol was filtered with 0.45-μm GHP (polypropylene) syringe filter and then mixed with the MFI seed crystal dispersion. The silica molar ratio of the seed suspension to the dC5 precursor sol was typically 1:200 and varied between 50 and 1000. The mixture was transferred into a Teflon-lined stainless-steel autoclave and then hydrothermally treated at 140° C. under static condition. The hydrothermal treatment time was varied from 36 h to 4 d.

MFI nanosheets shown in FIGS. 2 and 4 were prepared using a 36 h reaction time and possessed non-negligible amount of amorphous silica, which was removed by KOH treatment. In brief, 1 ml of as-synthesized MFI nanosheet dispersion was mixed with 1 ml of 0.1 M KOH solution and then centrifuged at 10,000 RCF for 30 s in order to remove nanosheet aggregates. Then, 1 ml of the top solution was transferred to a new centrifuge tube and diluted to 2 ml with 0.1 M KOH solution. MFI nanosheets were collected by centrifugation at 14,500 RCF for 3 min and decantation. The acquired white slurry was re-dispersed in 2 ml of 0.1 M KOH/2 M KCl solution and kept at room temperature for 8 hours to dissolve amorphous silica. MFI nanosheets were then recovered by centrifugation at 14,500 RCF for 3 min and decantation. The acquired material was sequentially rinsed with 0.1 M KOH/2 M KCl solution and then 0.1 M $HNO_3$/2 M KCl by re-dispersion and centrifugation, as described above. The rinsing process was repeated twice with DI water.

MFI nanosheets synthesized using a 4-day reaction time do not contain amorphous silica and were used without KOH treatment. 1 ml of as-synthesized MFI nanosheet dispersion was diluted to 2 ml with DI water and centrifuged at 10,000 RCF for 30 s. 1 ml of the top solution was transferred to a new micro-centrifuge tube and diluted to 2 ml with DI water. MFI nanosheets were recovered by centrifugation at 14,500 RCF for 1 min and decantation. This rinsing process with DI water was repeated three times.

The collected MFI nanosheet slurry was then dispersed in 2-ml DI water for characterization, 50-mL DI water for filtration coating or dispersed in 4-ml of DI water containing 5 vol % ethanol for floating particle coating method.

Preparation of MFI Nanosheets with Improved Thickness Uniformity

Seed Removal of MFI Nanosheets:

MFI nanosheets were coated on Si wafer using Langmuir-Schaefer deposition method. Small amount of ethanol (5 vol %) was added to freshly-prepared MFI nanosheet dispersion (2 ml, as described above), and 300 μl of the dispersion was deposited on the surface of water in polystyrene Petri dish (35-mm diameter). Si wafer was slowly lowered and contacted with water surface to transfer the MFI nanosheets to the Si wafer. Then, the Si wafer was tilted and lifted upward, and water remaining on the Si wafer was removed by air blow. Prepared MFI nanosheet coating was then calcined at 400° C. for 6 h at a ramp rate of 1° C./min. MFI nanosheets on Si wafer was then rubbed by cotton fabric to detach the seeds, followed by additional calcination under identical condition to remove any organic contamination.

Additional Growth of Fragments:

MFI nanosheets without seed crystals at the center were prepared using the techniques described herein. The nanosheets were subsequently fragmented to remove the seed structures at the center of the nanosheets, and grown to increase their size in the lateral direction.

MFI nanosheets were fractured using a Qsonica sonicator with a ¼" probe. 30 ml of an as-synthesized MFI dispersion was sonicated for 2 min under ambient condition. MFI nanosheet fragments were subsequently purified by centrifugation. The horn-sonicated MFI nanosheet dispersion was centrifuged at 5,000 g for 1 min, and the supernatant was collected by decantation. This was repeated 4 times.

The acquired MFI nanosheet fragments show more uniform thicknesses, compared to as-synthesized, seed-containing nanosheets. In addition, additional growth of the fragments increases the basal dimension of the MFI nanosheets. A precursor sol with a composition of 80TEOS:3.75dC5:20KOH:9500$H_2O$ was hydrolyzed at room temperature for 16 h and then filtered with 0.45-μm GHP (polypropylene) a syringe filter. The reaction sol was prepared by mixing the identical weight of the filtered precursor sol and the MFI nanosheet fragment dispersion. The mixture was transferred into a Teflon-lined stainless-steel autoclave and then hydrothermally treated at a temperature ranging between 140° C.-180° C. under static condition. The ratio of seed and precursor sol and the hydrothermal reaction temperature was varied to yield MFI nanosheets with different morphologies.

MFI Membrane Fabrication

Filtration Method:

MFI membrane was fabricated on porous quartz support based on inter-growth of MFI nanosheets. Sintered Silica Fiber (SSF) supports were prepared from quartz fiber and Stöber silica. 1 g of freshly-prepared (50 ml, as described above) MFI nanosheet dispersion was then coated on SSF supports with the vacuum-assisted filtration method. During the filtration coating, vacuum was maintained above 10 psi to keep the filtration slow. The filtration was typically finished within 2 h and kept under vacuum overnight for complete drying. The MFI nanosheet coatings on SSF supports were calcined at 400° C. for 6 h at a ramp rate of 1° C. $min^{-1}$ under 100 ml/min of air flow after each coating step. Filtration coating was repeated until no vacancy was observed by SEM analysis.

Continuous MFI membranes were prepared by gel-free growth of MFI nanosheets on SSF supports. In brief, nanosheet-coated SSF supports were impregnated with 0.025 M TPAOH solution and placed in a Teflon-lined stainless-steel autoclave after excess solution on the side and bottom of the support was removed by Kim-Wipes.™ The autoclave was then heated at 180° C. for 2 d. The resultant membrane was rinsed with DI water and dried at 70° C. Before xylene isomer vapor permeance measurements, the membrane was calcined at 450° C. for 8 h at a ramp rate of 1° C./min.

Floating Particle Coating Method:

A substrate (e.g., Si wafer or porous sintered silica fiber support) was first placed in a conical-shape Teflon trough (50-mm top I.D., 18-mm bottom I.D., and 26-mm height). The substrate was slightly tilted by using a Teflon holder (ca. 5°) to suppress the lateral flow near the substrate during draining of water. After the trough was filled with DI water, 600-800 μl MFI nanosheet dispersion was slowly deposited drop by drop on the surface of water by using a micropipette. The water in the trough was then drained to slowly lower the surface level of the water below the substrate (ca. ~1 cm/h). At the moment of the deposition, the area of the air-water interface was reduced to 40~50%. The MFI nanosheet coating on the substrate was then dried under ambient condition. For nanosheet coating on a porous SSF support, additional drying was performed at 70° C. overnight. Immobilization of the nanosheets on the substrate was conducted by heat treatment at 400° C. for 6 h with a ramp rate of 1° C./min.

MFI membranes were fabricated from the MFI nanosheet seed coatings prepared by using the floating particle coating method. MFI nanosheets were coated on porous SSF supports by the floating-particle coating method and then heat-treated at 400° C. for immobilization of the nanosheets. The coatings processes were repeated twice to improve the surface coverage of the nanosheets. The MFI nanosheet coatings on SSF supports were intergrown by gel-free secondary growth at 180° C. for 4 days using an impregnating solution with composition 0.025M TPAOH or at 180° C. for 1 day using an impregnating solution with composition 0.025M TPAOH/0.0025M NH$_4$F. In brief, the MFI nanosheet coatings on porous SSF supports were soaked in the impregnating solution for 5 min. Excess solution was removed by using Kimwipes from the bottom surfaces of the supports. The amount of the impregnating solution was typically ~0.35 g. Then, the support with the seed coating was placed in a Teflon-lined stainless steel autoclave and was heat-treated as described above in the absence of any added liquid. The membrane was then calcined at 450° C. for 8 hours with a ramp rate of 1° C./min before the permeation test.

Characterization

SEM images were acquired by using Hitachi SU 8230 or Hitachi S-4700 operated at 1.5 kV. High-resolution SEM images were acquired in a deceleration mode of Hitachi SU 8230 with 0.8-kV landing voltage. Height profiles of calcined MFI nanosheets on Si wafers were acquired in a tapping mode under ambient condition by using Bruker Nanoscope V Multimode 8. Focused ion beam milling was performed with FEI Quanta 200 3D, in order to make a trench on the membrane for cross-sectional measurements. XRD patterns of MFI membranes were recorded by using a PANalytical X'Pert Pro diffractometer with Cu—Kα radiation. High-resolution powder diffraction data were collected at Beamline 17-BM of Advanced Photon Source (APS) with a monochromatic beam of 0.72768 Å at Argonne National Laboratory. Powder samples were prepared by freeze-drying with Labconco FreeZone 4.5 liter Benchtop Freeze-Dry System. Collected data were processed with GSAS II and converted to 2θ values corresponding to Cu—Kα radiation. Pawley fitting was employed to extract lattice parameters using GSAS II. The in-plane XRD measurements were performed at beamline 33-BM-C at the Advanced Photon Source (0.8267 Å), Argonne National Laboratory. The instrumentation consists of a bending magnet source with Si(111) monochromator with 0.9×0.5 mm beam spot. The sample was placed on a Huber 4-circle stage with the sample held almost parallel to the incident beam, and the detector was moved in the plane of the sample. 2θ values were then converted to those corresponding to Cu—Kα radiation.

Conventional transmission electron microscopy (CTEM) was performed on a FEI Tecnai G2 F30 (S)TEM with TWIN pole piece, a Schottky field-emission electron gun operating at 300 kV and equipped with a Gatan 4 k×4 k Ultrascan CCD. Imaging and diffraction data collection were performed under low electron dose to minimize electron beam damage of the zeolite sample. HAADF-STEM images were acquired in an aberration-corrected FEI Titan 60-300 (S)TEM, operating at 200 kV and having a STEM incident probe convergence angle of 24 mrad with 20 pA screen current, and ~50 mrad HAADF detector inner angle. TEM samples were prepared by drop-casting a suspension of seeded nanosheets in water on TEM grids (ultrathin carbon film on holey carbon support film, 400 mesh Cu, Ted Pella). The grid was dried at room temperature before imaging in the TEM.

Theoretical Calculations

The model membrane system consists of 1×3×1 unit cells of the MFI structure, with periodic replication in the a, c-directions and the two {010} surfaces truncated, and 1-6 dC5 cations The exposed oxygen atoms were terminated as surface silanol groups, and 30 Å vacuum space is added to the b-direction. To maintain charge neutrality of the system, an appropriate number of deprotonated silanol defects (SR)) was created to compensate for the SDA cations. Periodic Kohn-Sham density-functional theory calculations were performed using the Vienna Ab initio Simulation Package, version 5.4.1, with the PBE exchange-correlation functional, Grimme D2 dispersion corrections, the valence electron density expanded in a plane-wave basis set using a kinetic energy cutoff of 400 eV, and the core electrons described by the projected-augmented wave method. Sampling of the unit cell was carried out at the Γ-point. During the geometry optimizations, the cell shape was allowed to change but the total volume was kept constant. The vacuum space present in the supercell permits the MFI membrane to still swell or contract at will.

Permeation Test

Xylene permeation measurements were performed in the Wicke-Kallenbach mode. In brief, the carrier gas (helium) was directed through a saturator containing xylene isomer mixture and supplied to the feed side of a membrane module, while the sweep gas (helium) is purging the permeate side. Total pressures of both sides were kept at atmospheric pressure. The concentration of each species was determined by gas chromatograph with flame ionization detector (GC/FID). With the saturator at room temperature, the feed partial pressures of p- and o-xylene are ~0.5 kPa.

For butane permeation measurement, an equimolar binary mixture of n-/i-butane was flowed into the feed side of the module without carrier gas (~50 kPa for each), while the permeate side of the module was purged with sweep gas (helium). The concentration of each species was determined by GC with a thermal conductivity detector (GC/TCD). The performance of separation membrane is typically assessed with permeance and separation factor. The permeance is the flux normalized by the partial pressure gradient across the membrane. Separation factor is the concentration ratio of two isomers in the permeate side divided by that in the feed side.

Pervaporation Test

Ethanol/water pervaporation experiments were performed with a home-built pervaporation set-up. In brief, liquid ethanol/water mixture feed (5 wt % of ethanol) was flowed into the feed side of a membrane module after heated with a Lauda-Brinkman ECO thermostat. The permeate side of the membrane module was connected to a vacuum pump through liquid-nitrogen cold traps, which collected permeates. The total amount of permeate was determined by weight, and its composition was determined by GC/TCD.

Overall pervaporation separation factor ($\alpha_{pervap}$) was defined as the mass fraction ratio of ethanol and water in the permeate divided by that in the feed.

$$\alpha_{pervap} = \frac{m_{ethanol,p}/m_{water,p}}{m_{ethanol,f}/m_{water,f}}$$

As the membrane pervaporation can be considered as a series of evaporation and membrane permeation, this overall pervaporation separation factor ($\alpha_{pervap}$) can be further divided into two factors, evaporation selectivity ($\alpha_{evap}$) and intrinsic membrane selectivity ($\alpha_{mem}$), that are defined as $$\alpha_{pervap} = \alpha_{evap} \times \alpha_{mem}$$

$$\alpha_{evap} = \frac{m_{ethanol,v}/m_{water,v}}{m_{ethanol,f}/m_{water,f}}$$

$$\alpha_{mem} = \frac{m_{ethanol,p}/m_{water,p}}{m_{ethanol,v}/m_{water,v}}$$

Where $m_{ethanol,v}$ and $m_{water,v}$ are the mass fractions of ethanol and water, respectively, in the vapor phase under equilibrium with the liquid feed. Then, the intrinsic membrane selectivity is the same as the separation factor calculated from the permeance ratio of the components. The vapor-phase mass fractions were calculated by Aspen Plus V8.0 with NRTL model.

TABLE 1 p-xylene separation performance measured for p-/o-xylene 1:1 binary mixture

| | p-xylene permeance (mol · m$^{-2}$ · s$^{-1}$ · Pa$^{-1}$) | o-xylene permeance (mol · m$^{-2}$ · s$^{-1}$ · Pa$^{-1}$) | Separation factor |
|---|---|---|---|
| Membrane B* | 2.4 × 10$^{-7}$ | 5.7 × 10$^{-11}$ | 2920 |
| Membrane C* | 2.6 × 10$^{-7}$ | 2.2 × 10$^{-11}$ | 7890 |

*MFI membranes were fabricated from the nanosheet seed coatings prepared by the filtration method.

TABLE 2 p-xylene separation performance of MFI membrane A# measured for a multi-component mixture

| Temperature (° C.) | p-xylene permeance (mol · m$^{-2}$ · s$^{-1}$ · Pa$^{-1}$) | Separation factor | | | |
|---|---|---|---|---|---|
| | | p-x*/o-x† | p-x/m-x‡ | p-x/EB§ | p-x/TMB‖ |
| 150 | 7.8 × 10$^{-7}$ | 1250 | 1720 | 4.0 | 840 |
| 120 | 1.9 × 10$^{-7}$ | 2390 | 1380 | 4.6 | 291 |
| 75 | 4.8 × 10$^{-9}$ | 290 | 155 | 3.8 | 7.3 |

*p-xylene,
†o-xylene,
‡w-xylene,
§Ethylbenzene,
‖Trimetylbenzene
MFI membrane was fabricated from the nanosheet seed coatings prepared by the filtration method.

TABLE 3

Ethanol/water pervaporation and n-/i-butane separation performance of MFI membranes (D and E)*

| | Ethanol/water pervaporation (60° C.) | n-/i-butane separation (25° C.) |
|---|---|---|
| Flux | 1.8 kg · m$^{-2}$ · h$^{-1}$ | 8.5 × 10$^{-3}$ mol · m$^{-2}$ · s$^{-1}$ |
| Permeance | . | 2.0 × 10$^{-7}$ mol · m$^{-2}$ · s$^{-1}$ · Pa$^{-1}$ |
| Separation Factor | 35 | 50 |

*MFI membrane was fabricated from the nanosheet seed coatings prepared by the filtration method.

TABLE 4

Xylene isomer separation results of MFI membranes† measured for p-/o-xylene binary mixture feed (~500 Pa for each).

| | Temperature [° C.] | Permeance [mol m$^{-2}$ s$^{-1}$ Pa$^{-1}$] | Separation factor |
|---|---|---|---|
| Membrane G | 150 | 1.4 × 10$^{-7}$ | >10,000* |
| | 250 | 0.8 × 10$^{-7}$ | 7,700 |
| Membrane H | 150 | 2.9 × 10$^{-7}$ | >10,000* |
| | 250 | 1.4 × 10$^{-7}$ | 8,600 |
| Membrane I | 150 | 2.2 × 10$^{-7}$ | >10,000* |
| | 250 | 0.7 × 10$^{-7}$ | >10,000* |

*o-xylene signal was under the detectable level.
†MFI membrane was fabricated from the nanosheet seed coatings prepared by the floating particle coating method.

TABLE 5

Butane isomer permeation results of MFI membranes* measured for n-/i-butane binary mixture feed (~50 kPa for each).

| | Temperature [° C.] | Permeance [mol m$^{-2}$ s$^{-1}$ Pa$^{-1}$] | | Separation factor |
|---|---|---|---|---|
| | | n-butane | i-butane | |
| Membrane I | 22 | 9.7 × 10$^{-8}$ | 1.4 × 10$^{-9}$ | 64 |
| | 50 | 1.3 × 10$^{-7}$ | 2.6 × 10$^{-9}$ | 45 |
| | 100 | 2.0 × 10$^{-7}$ | 5.6 × 10$^{-9}$ | 30 |
| | 150 | 2.9 × 10$^{-7}$ | 9.4 × 10$^{-9}$ | 24 |
| | 200 | 4.3 × 10$^{-7}$ | 1.6 × 10$^{-8}$ | 20 |
| Membrane J | 22 | 3.3 × 10$^{-7}$ | 3.7 × 10$^{-9}$ | 69 |
| | 50 | 5.6 × 10$^{-7}$ | 1.1 × 10$^{-8}$ | 34 |
| | 100 | 6.2 × 10$^{-7}$ | 2.6 × 10$^{-8}$ | 16 |
| | 150 | 7.4 × 10$^{-7}$ | 4.7 × 10$^{-8}$ | 10 |
| | 200 | 7.2 × 10$^{-7}$ | 5.0 × 10$^{-8}$ | 9 |

*MFI membrane was fabricated from the nanosheet seed coatings prepared by the floating particle coating method.

TABLE 6

Ethanol/water pervaporation results for MFI membranes* measured at 60° C. for 5 wt % ethanol feed.

| | Total flux [kg m$^{-2}$ h$^{-1}$] | Ethanol flux [kg m$^{-2}$ h$^{-1}$] | $\alpha_{pervap}$ | $\alpha_{mem}$ |
|---|---|---|---|---|
| Membrane I | 3.09 | 2.19 | 46 | 4.4 |
| Membrane K | 2.66 | 1.69 | 34 | 3.2 |
| Membrane L | 3.13 | 1.81 | 29 | 2.6 |
| Membrane M | 3.32 | 2.08 | 30 | 2.8 |
| Membrane N | 3.29 | 1.96 | 28 | 2.6 |
| Membrane O | 3.94 | 2.58 | 38 | 3.5 |

*MFI membrane was fabricated from the nanosheet seed coatings prepared by the floating particle coating method.

A number of embodiments have been described. Nevertheless, it will be understood that various modifications may be made without departing from the spirit and scope of the invention. Accordingly, other embodiments are within the scope of the claims.

What is claimed is:

1. A material comprising:
  a planar layer of MFI zeolite; and
  a MFI zeolite particle embedded in the planar layer of MFI zeolite,
    wherein the planar layer has a thickness in a range between 4 nm and 10 nm for at least 70% of a basal area of the planar layer.

2. The material of claim 1, wherein the planar layer of zeolite has a thickness of approximately 2.5 unit-cells along the b-axis of MFI structure for at least 70% of its basal area, and wherein the planar layer has a length of at least 0.5 μm along at least two basal orthogonal directions.

3. The material of claim 1, wherein the planar layer of zeolite has a thickness of approximately 3.5 unit-cells along the b-axis of MFI structure for at least 70% of its basal area, and wherein the planar layer has a length of at least 0.5 μm along at least two basal orthogonal directions.

4. The material of claim 1, wherein the planar layer of zeolite has a thickness of approximately 2.5 unit-cells along the b-axis of MFI structure for at least 70% of its basal area, and wherein the planar layer has a length of 1 μm along at least a basal direction.

5. The material of claim 1, wherein the planar layer of zeolite has a thickness of approximately 3.5 unit-cells along the b-axis of MFI structure for at least 70% of its basal area, and wherein the planar layer has a length of 1 μm along at least a basal direction.

6. The material of claim 1, wherein the planar layer of MFI zeolite has a first orientation, wherein the MFI zeolite particle has a second orientation, and wherein a rotational orientation of the first planar layer of MFI zeolite is different than a rotational orientation of the MFI zeolite particle.

7. The material of claim 6, wherein the rotational orientation of the planar layer of MFI zeolite differs from the rotational orientation of the MFI zeolite particle by approximately 90° about a rotational axis.

8. The material of claim 7, wherein the rotational axis extends parallel to a basal surface of the planar layer.

9. The material of claim 8, the material having a single planar layer of MFI zeolite and a single MFI zeolite particle embedded in the planar layer of MRI zeolite.

10. The material of claim 1, wherein the MFI zeolite particle has maximum dimension less than 200 nm.

11. The material of claim 1, wherein the planar layer has a length of at least 0.5 μm along at least two orthogonal basal directions.

12. The material of claim 1, the planar layer defining a network of pores, wherein the network of pores comprises pores having widths between approximately 5 Å and 6 Å.

13. The material of claim 1, further comprising a porous support structure, wherein the planar layer is disposed on a surface of the support structure.

14. The material of claim 1, wherein the thickness of the MFI zeolite planar layer is measured by at least one of atomic force microscopy, electron microscopy, or x-ray diffraction.

* * * * *

UNITED STATES PATENT AND TRADEMARK OFFICE
CERTIFICATE OF CORRECTION

PATENT NO. : 11,066,309 B2  
APPLICATION NO. : 15/791876  
DATED : July 20, 2021  
INVENTOR(S) : Tsapatsis et al.

Page 1 of 1

It is certified that error appears in the above-identified patent and that said Letters Patent is hereby corrected as shown below:

On the Title Page

Column 2, Item (56) PUBLICATIONS, Line 1, delete "asssisted" and insert -- assisted --;

In the Claims

Column 28, Line 7, Claim 9, delete "the" and insert -- wherein the --;

Column 28, Line 9, Claim 9, delete "MRI" and insert -- MFI --;

Column 28, Line 15 (approx.), Claim 12, delete "the" and insert -- wherein the --.

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*